(12) United States Patent
Nicholson et al.

(10) Patent No.: US 12,738,198 B2
(45) Date of Patent: Sep. 15, 2026

(54) IMAGE DISPLAY USING A SEGMENTED BACKPLANE

(71) Applicant: Google LLC, Mountain View, CA (US)

(72) Inventors: Stuart James Myron Nicholson, San Jose, CA (US); Jeffrey Tang Fung Li, Palo Alto, CA (US); Robert Lo, San Jose, CA (US); Edwin Lyle Hudson, San Jose, CA (US); Kaushik Indravadan Sheth, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 15 days.

(21) Appl. No.: 18/859,641

(22) PCT Filed: Oct. 30, 2023

(86) PCT No.: PCT/US2023/078188

§ 371 (c)(1),
(2) Date: Oct. 24, 2024

(87) PCT Pub. No.: WO2025/095964

PCT Pub. Date: May 8, 2025

(65) Prior Publication Data

US 2026/0038421 A1 Feb. 5, 2026

(51) Int. Cl.

| | |
|---|---|
| ***G09G 3/32*** | (2016.01) |
| ***G09G 3/00*** | (2006.01) |
| ***H04N 13/398*** | (2018.01) |

(52) U.S. Cl.

CPC ............... *G09G 3/32* (2013.01); *G09G 3/003* (2013.01); *H04N 13/398* (2018.05);
(Continued)

(58) Field of Classification Search

CPC ........... G09G 3/003; G09G 3/32–3291; G09G 2310/04; G09G 2310/06; G09G 2310/08;
(Continued)

(56) References Cited

U.S. PATENT DOCUMENTS

| | | | | |
|---|---|---|---|---|
| 2004/0085303 A1* | 5/2004 | Yabuuchi ............. | G09G 3/3611 345/204 |
| 2006/0146042 A1* | 7/2006 | Ravichandran .......... | G09G 3/20 345/211 |

(Continued)

FOREIGN PATENT DOCUMENTS

| | | |
|---|---|---|
| CN | 112185295 A | 1/2021 |
| EP | 2161713 A1 | 3/2010 |

(Continued)

OTHER PUBLICATIONS

International Search Report and Written Opinion for PCT Application No. PCT/US2023/078188, mailed on Mar. 21, 2024, 17 pages.
Office Action for Taiwanese Application No. 113140699 (with English translation), dated Oct. 13, 2025, 16 pages.

*Primary Examiner* — Nathan Danielsen
(74) *Attorney, Agent, or Firm* — BRAKE HUGHES BELLERMANN LLP

(57) ABSTRACT

A display system may include a segment analyzer, a segment buffer, and a set of pixel drivers. The segment analyzer may perform an analysis of image data representing an image to be displayed. The analysis distinguishes a first portion of the image data that corresponds to an active segment of the image containing non-zero content from a second portion of the image data that corresponds to an empty segment of the image without non-zero content. The segment buffer stores the first portion of the image data in accordance with a segment map based on the analysis. The pixel drivers then use the segment map and the image data to cause a set of pixels to display the image by driving a first subset of pixels
(Continued)

associated with the active segment without driving a second subset of pixels associated with the empty segment.

21 Claims, 11 Drawing Sheets

(52) U.S. Cl.
CPC ... *G09G 2310/04* (2013.01); *G09G 2330/022* (2013.01); *G09G 2330/023* (2013.01); *G09G 2350/00* (2013.01); *G09G 2360/18* (2013.01)

(58) Field of Classification Search
CPC .................................. G09G 2320/0233–0242; G09G 2320/04–046; G09G 2320/0686; G09G 2330/021–023; G09G 2350/00; G09G 2360/18; H04N 13/398
See application file for complete search history.

(56) References Cited

U.S. PATENT DOCUMENTS

2016/0093255 A1* 3/2016 Aoki .................... G09G 3/3426 345/88
2016/0117993 A1 4/2016 Buckley et al.
2017/0308226 A1* 10/2017 Yoo .......................... G09G 3/20
2018/0204303 A1* 7/2018 Bae .......................... G09G 3/20
2019/0237021 A1 8/2019 Peng et al.
2022/0013053 A1* 1/2022 Kim .......................... G09G 3/20

FOREIGN PATENT DOCUMENTS

EP 3440662 B1 10/2022
TW 201907298 A 2/2019

* cited by examiner

IMAGE DISPLAY USING A SEGMENTED BACKPLANE

CROSS-REFERENCE TO RELATED APPLICATION

This application is a 35 U.S.C. § 371 National Phase Entry Application from PCT/US2023/078188, filed on Oct. 30, 2023, entitled "IMAGE DISPLAY USING A SEGMENTED BACKPLANE", the disclosure of which is incorporated herein by reference in its entirety.

TECHNICAL FIELD

This description relates to image displays.

BACKGROUND

Digitally-encoded images may be presented to viewers using a variety of different types of image displays featured in a variety of different types of devices. For example, personal computing devices (e.g., laptops, tablets, etc.), mobile devices (e.g., smartphones, electronic readers, etc.), wearable devices (e.g., smart watches, etc.), extended reality devices (e.g., virtual and augmented reality headsets), televisions, and various other devices all may feature image displays configured to present images to users of the devices.

SUMMARY

Display systems implementing an image display that uses a segmented backplane are described herein. A segmented backplane makes it possible for an image display to seamlessly scale up and scale down power, memory, and other resource usage by the image display as images with different characteristics are presented. In particular, segmented backplanes described herein may provide significant efficiencies when used to display images with relatively sparse content such as, for example, a heads-up display of an augmented reality device (e.g., which may be designed to avoid overwhelming viewers with excessive content as they navigates the surrounding environment with the augmented content in view), a minimalistic watch face or lock screen (e.g., which may be implemented with minimal content for aesthetic reasons or to save power when the display is not actively in use), and so forth. When a significant portion of an image display is not needed to display a particular image (due to this sparseness of content), segmented backplanes described herein can save power (e.g., automatically save power) by systematically deactivating portions of the backplane not being used to drive pixels, by systematically reducing the processing, buffering, and movement time of the image data, and by otherwise optimizing resource usage to allow the image to be properly displayed in a highly efficient way.

To this end, in one implementation, an illustrative display system may comprise a segment analyzer configured to perform an analysis of image data representing an image to be displayed during a time period. This analysis may distinguish a first portion of the image data that corresponds to an active segment of the image (a segment containing non-zero content) from a second portion of the image data that corresponds to an empty segment of the image (a segment without non-zero content). The display system may further comprise a segment buffer configured to store, in accordance with a segment map based on the analysis, at least the first portion of the image data. The display system may further comprise a set of pixel drivers configured to use the segment map and the first portion of the image data stored in the segment buffer to cause a set of pixels to display the image during the time period by driving a first subset of the set of pixels (a subset associated with the active segment), and without driving a second subset of the set of pixels (a subset associated with the empty segment). In this way, power resources may be conserved by not activating the pixel drivers of the backplane to drive the second subset of pixels. Moreover, in certain implementations, additional power, memory, and/or other system resources may be conserved by avoiding buffering data for the second subset of pixels, avoiding fetching and processing such data, and so forth.

In certain implementations the illustrative display system above may include an image buffer that comprises: a segment analyzer configured to manage a segment map that distinguishes, for image data representing an image that is to be displayed during a time period: a first portion of the image data that corresponds to an active segment of the image containing non-zero content, from a second portion of the image data that corresponds to an empty segment of the image without non-zero content. The image buffer further comprises a segment buffer memory configured to: store, based on the segment map, the first portion of the image data; and send the segment map and the first portion of the image data to a set of pixel drivers configured to use the segment map and the first portion of the image data to cause a set of pixels to display the image during the time period by driving a first subset of the set of pixels, the first subset associated with the active segment, and without driving a second subset of the set of pixels, the second subset associated with the empty segment.

In another implementation, an example image buffer may be implemented within a display system (e.g., as part of the backplane of the display system). The image buffer may comprise a segment analyzer configured to manage a segment map that distinguishes, for image data representing an image that is to be displayed during a time period, a first portion of the image data that corresponds to an active segment of the image containing non-zero content from a second portion of the image data that corresponds to an empty segment of the image without non-zero content. The image buffer may further comprise segment buffer memory. The segment buffer memory may be configured to store, based on the segment map, the first portion of the image data. The segment buffer memory may be further configured to send the segment map and the first portion of the image data to a set of pixel drivers configured to use the segment map and the first portion of the image data to cause a set of pixels to display the image during the time period. For example, the pixel drivers may be configured to drive a first subset of the set of pixels (e.g., a subset associated with the active segment) without driving a second subset of the set of pixels (e.g., a subset associated with the empty segment). Similar resources savings as described above (as well as other benefits described herein) may result from this implementation.

In yet another implementation, an illustrative method may be performed by an image buffer included in a display system. The method may comprise managing a segment map that identifies, within image data representing an image that is to be displayed during a time period, both 1) a first portion of the image data that corresponds to an active segment of the image containing non-zero content, and 2) a second portion of the image data that corresponds to an empty segment of the image without non-zero content. The method may further comprise storing the first portion of the image data based on the segment map and sending the segment map and the first portion of the image data to a set of pixel drivers. Similarly as described above, the pixel drivers to which this information is sent may be configured to use the segment map and the first portion of the image data to cause a set of pixels to display the image during the time period by driving a first subset of the set of pixels (the first subset associated with the active segment), and without driving a second subset of the set of pixels (the second subset associated with the empty segment). Similar resources savings as described above (as well as other benefits described herein) may also result from this implementation.

In yet another implementation, a method may be performed by a display system. The method may comprise the steps: performing, by a segment analyzer, an analysis of image data representing an image to be displayed during a time period, the analysis distinguishing: a first portion of the image data that corresponds to an active segment of the image containing non-zero content, from a second portion of the image data that corresponds to an empty segment of the image without non-zero content; storing, by a segment buffer, in accordance with a segment map based on the analysis, the first portion of the image data; and causing, by a set of pixel drivers configured to use the segment map and the first portion of the image data stored in the segment buffer, a set of pixels to display the image during the time period by driving a first subset of the set of pixels, the first subset associated with the active segment, and without driving a second subset of the set of pixels, the second subset associated with the empty segment.

The details of these and other implementations are set forth in the accompanying drawings and the description below. Other features will also be made apparent from the following description, drawings, and claims.

DETAILED DESCRIPTION

Figure 1:
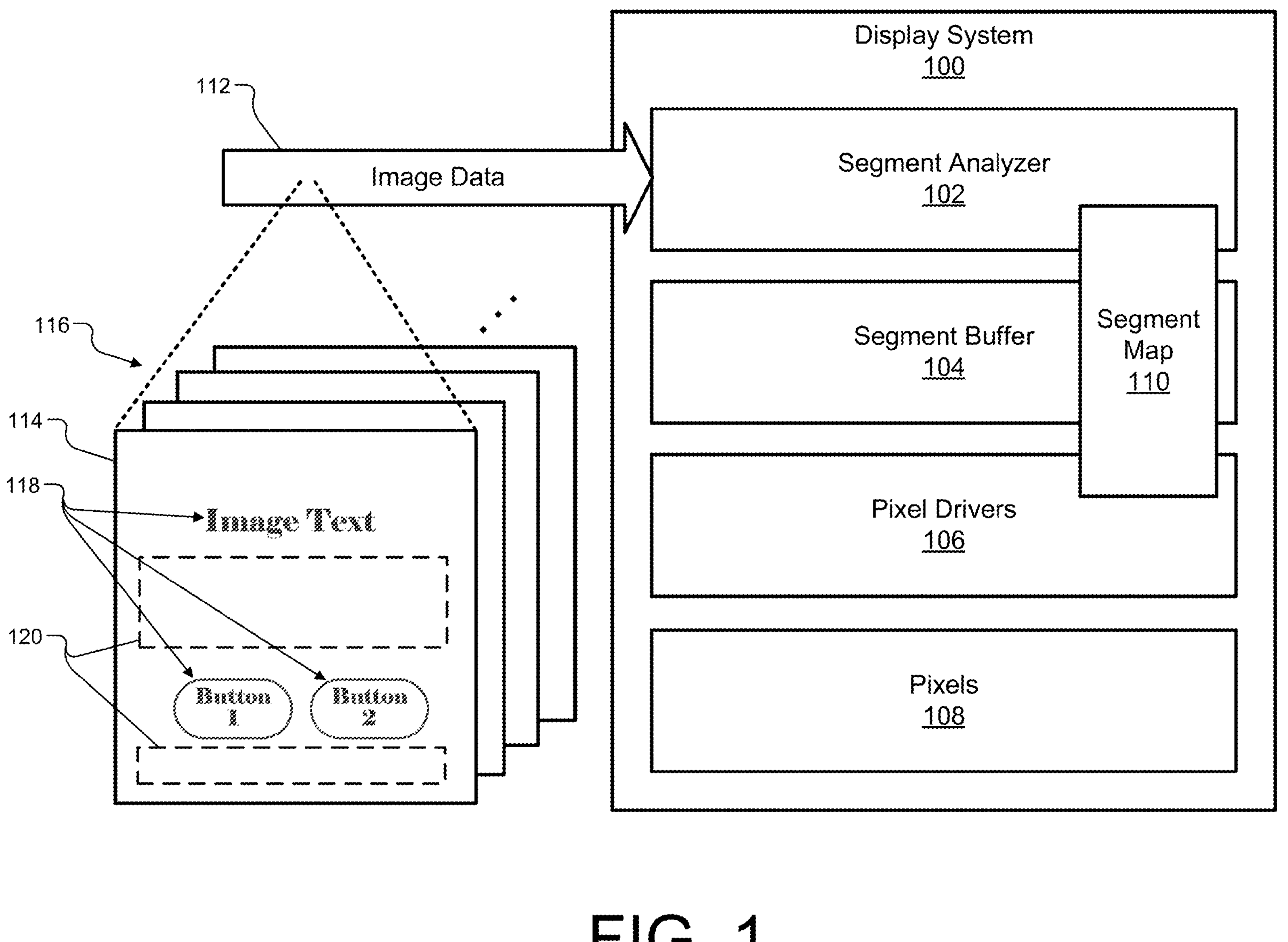
FIG. 1 shows an illustrative display system implementing an image display using a segmented backplane in accordance with principles described herein.

Display systems implementing an image display that uses a segmented backplane are described herein. Emissive display systems consume power roughly proportional to the average image pixel intensity. Along with the power consumed in driving pixels to a particular intensity level, power may also be used to buffer image data, to process and update image data, to move image data within the system, and so forth.

For many applications and types of electronic systems and devices in which a display system is implemented (e.g., applications and devices reliant on battery power, etc.), power consumption may be a significant design consideration and/or constraint. While it is generally desirable for all electronic devices to operate as efficiently as possible (e.g., using minimal power, generating minimal heat, etc.), certain types of devices may be especially sensitive to the technical problem of consuming power inefficiently. For example, the overall battery life of battery-powered devices may be a significant consideration of consumers looking to purchase such devices and the experience that a device is able to provide a user may depend greatly on how effectively and how long it can perform given a certain amount of battery charge.

Another technical problem that electronic devices featuring image displays may face relates to the heat generated by the device. The heat generated by a device is related to the power consumption of the device and, when power is consumed inefficiently, the heat may detract from a user experience, particular for devices such as extended reality headsets (e.g., augmented reality glasses, etc.) that are worn on or close to the body. For these reasons and more, it is desirable to optimize the power consumption of these devices, including by making power usage by integrated image displays as efficient as possible.

To address at least these technical problems, image displays described herein use segmented backplanes to seamlessly scale up and scale down power, memory, and other resources used by the image displays in accordance with the characteristics of the images being presented. As will be set forth, images with relatively sparse content, referred to herein as images with a low fill-factor, may be well-positioned for a segmented backplane to help display in a highly efficient way (e.g., using significantly less power and/or other resources than if a conventional backplane were used). As will be illustrated and described, low fill-factor images refer to images in which relatively large portions of the image are empty (i.e., devoid of non-zero content), such that pixels depicting these empty portions would have zero intensity along at least one color dimension (red, green, or blue). Such low fill-factor images may include portions that are completely empty of all colors (e.g., completely black) or of particular colors (e.g., an entirely red portion that is empty of green and blue components).

Low fill-factor images may be found in various types of media content, sometimes interspersed with other images that have higher fill-factors. For example, certain frames of a video may have only a small amount of non-zero content (e.g., a few words of text for a title introducing a new segment of the video) and may then be followed by other frames that are generally full of non-zero content (e.g., footage of a scene). While such low fill-factor images may be found in various use cases, however, they may be found more commonly in certain use cases and applications. As one example, it may be undesirable for too much non-zero content to be presented at any one time (i.e., for any given frame) for a heads-up display of an augmented reality device, since the viewer may be navigating the real world and could become overwhelmed if too much augmented content crowds out the surrounding environment. In other examples such as watch faces, mobile device lock screens, laptop screensavers, and so forth, low fill-factor images may be desirable for aesthetic reasons (e.g., to give a minimalist look) or may serve as power-saving options when the devices are not in active use (e.g., while it may be desirable for the screen to show something in these scenarios, it may be assumed that the display is not being watched attentively).

In any of these or other scenarios where an image to be displayed has a relatively low fill-factor, such that a significant portion of the image display is not needed to display the image, segmented backplanes described herein provide technical solutions for the problem of inefficient power usage. Specifically, as will be described in more detail below, segmented backplanes may be configured to save power by systematically deactivating portions of the backplane not being used to drive pixel segments that are not currently associated with non-zero content. Additionally, segmented backplanes described herein may systematically reduce buffering of image data, reduce its associated processing and data movement, and otherwise optimize resource usage.

The technical effects of these solutions include at least allowing images (and low fill-factor images in particular) to be properly displayed in a highly efficient way that consumes less power and other resources than conventional techniques. By reducing power and resource usage in these ways, technical effects of battery life and heat output improvements may be significant, as mentioned above. Moreover, depending on design priorities for a given implementation, the benefits provided by segmented backplanes may be leveraged to make devices smaller, lighter, and so forth as a result of reduced battery, memory, and processing requirements for achieving the same image display performance.

Various implementations will now be described in more detail with reference to the figures. It will be understood that the particular implementations described below are provided as non-limiting examples and may be applied in various situations. Additionally, it will be understood that other implementations not explicitly described herein may also fall within the scope of the claims set forth below. Image displays using segmented backplanes may provide any or all of the technical benefits mentioned above, as well as various additional and/or alternative technical benefits that will be described and/or made apparent below.

FIG. 1 shows an illustrative display system 100 implementing an image display using a segmented backplane in accordance with principles described herein. As shown, display system 100 includes a segment analyzer 102, a segment buffer 104, a set of pixel drivers 106, and a set of pixels 108. A segment map 110 is also shown in FIG. 1 to be associated with segment analyzer 102 (which may generate and/or manage segment map 110 in ways described herein), and with segment buffer 104 and the set of pixel drivers 106 (which may use segment map 110 in ways described herein).

As further shown in FIG. 1, display system 100 may receive image data 112 which may include data representing one or more images, such as a sequence of video frames. Certain details of an image 114 represented by image data 112 are explicitly depicted in FIG. 1, while other images 116 that may also be represented by image data 112 are indicated to be in sequence with image 114 (e.g., as frames of a video sequence), though details of these images 116 are not explicitly shown. Each of the elements of display system 100 will now be described in more detail.

Segment analyzer 102 may be implemented as any computer hardware or circuitry (e.g., a processor or microprocessor, custom logic, etc.) that is configured to accumulate a segment of incoming image data (e.g., a row, contiguous pixels of a partial row, a block spanning multiple rows, an entire image frame, etc.) to perform an analysis of that segment of image data. For instance, if image 114 is to be displayed during a particular time period (e.g., a frame length, a length of time that a device is asleep, etc.), segment analyzer 102 may evaluate segments of image 114 to determine which portion or portions of image 114 include non-zero content (i.e., content that pixels will be driven to display) and, conversely, which portion or portions of image 114 are devoid or empty of such content (i.e., portions that include zero content or are empty with respect to at least one color component).

As will be described and illustrated in more detail below, this analysis may be performed with respect to portions of the image that correlate to certain segments of the display. For example, as will be illustrated, a segment could be implemented as an entire row of pixels, as one or more contiguous pixels on a row (but less than the entire row), as a block of pixels spanning multiple rows and columns, or the like. In some examples, these segments may be predesignated and segment analyzer 102 may be preprogrammed or hardwired to analyze the image data with respect to the predesignated segments. In other examples, the segments may be customized for a particular application or image type. The analysis performed by segment analyzer 102 may distinguish a first portion of the image data from a second portion of the image data. More particularly, the first portion of the image data may correspond to an active segment of the image that contains at least some (e.g., one or more pixels worth of) non-zero content. Conversely, the second portion of the image data may correspond to an empty segment of the image without non-zero content (i.e., a segment devoid of any non-zero content). The first portion may comprise image data that is not part of the image data comprised in the second portion.

Based on this analysis, segment analyzer 102 may identify portions of image data 112 that correspond to both active and empty segments of image 114. To illustrate, the example image 114 depicted in FIG. 1 is shown to include non-zero content 118 such as text ("Image Text") and two buttons ("Button 1" and "Button 2"). Alongside these non-zero content 118 instances, image 114 is also shown to include empty areas 120 that are devoid of non-zero content or may be referred to as having zero content. Dashed-line boxes between and below non-zero content 118 are explicitly labeled in FIG. 1 as empty areas 120, but it will be understood that other blank areas within image 114 (e.g., above and to the sides of the text, below and to the sides of the buttons, etc.) may also constitute empty areas, though these are not explicitly labeled. Because there is a relatively low ratio (e.g., less than 25%, less than 50%, etc.) of non-zero content to zero content (or empty areas) in image 114, image 114 may be considered a low fill-factor image that may be well-positioned for significant efficiency gains when displayed using an image display with a segmented backplane as described herein.

As the identifying of active and empty segments within the image data 112 representing image 114 is performed (i.e., as the active and empty segments are distinguished by the analysis of segment analyzer 102), segment analyzer 102 may be configured to produce and manage (e.g., store, continuously update as each new frame is analyzed, etc.) segment map 110, which may track which segments have been identified as active and which segments have been identified as empty. Segment map 110 may be implemented in any of several suitable ways described in more detail below. In particular, segment map 110 may be configured to be compatible with (i.e., to map to) segment buffer 104.

Segment buffer 104 may be configured to store portions of the image data in accordance with segment map 110 (i.e., based on the analysis by segment analyzer 102). In some implementations, segment buffer 104 may temporarily store (i.e., buffer) both 1) the portions of the image data corresponding to active segments such as the first portion of the image data mentioned above (referred to herein as active portions of the image data), and 2) the portions of the image data corresponding to empty segments such as the second portion of the image data mentioned above (referred to herein as empty portions of the image data). In other implementations, segment buffer 104 may only store or buffer the active portions while conserving power (and possibly memory resources) by abstaining from also storing or buffering the empty portions. These different types of implementations will be described and illustrated in more detail below. In either case, the storing of the image data may be performed based on and in accordance with segment map 110 so that the set of pixel drivers 106 may handle known active segments and empty segments differently to thereby achieve efficiencies described herein.

The set of pixel drivers 106 may be configured to use segment map 110 and the image data stored in segment buffer 104 (e.g., at least the first portion of the image data) to cause the set of pixels 108 to display images (e.g., image 114) during the appropriate times (e.g., during the time period to which image 114 corresponds). Specifically, pixel drivers 106 may drive a first subset of the set of pixels 108 that is associated with the active segment or segments while not driving (i.e., without driving) a second subset of the set of pixels 108 that is associated with the empty segment or segments. As has been described, significant power savings may be achieved by only activating pixel drivers 106 that are associated with active segments (which, in a low fill-factor image, may be relatively sparse) and while allowing pixel drivers 106 that are associated with empty segments to remain in an inactive state (conserving power that would otherwise be used to activate the pixel drivers).

While segmented backplanes described herein and non-segmented (conventional) backplanes alike may both draw power to emit light from actively-driven pixels for an image such as image 114, segmented backplanes such as described for display system 100 may conserve power in ways that are not available to conventional backplanes. As will be described or made more apparent below, these power savings may be different from implementation to implementation, but may include any of the following: conserving power that would be used to activate pixel drivers that are associated with empty segments of a particular image, fetching image data (by the pixel drivers) associated with the empty segments, storing and buffering image data associated with the empty segments, and processing image data associated with the empty segments. By avoiding one or more of these usages of system power, segmented backplanes described herein allow image displays such as implemented by display system 100 to be more efficient than conventional image displays.

Figure 2A:
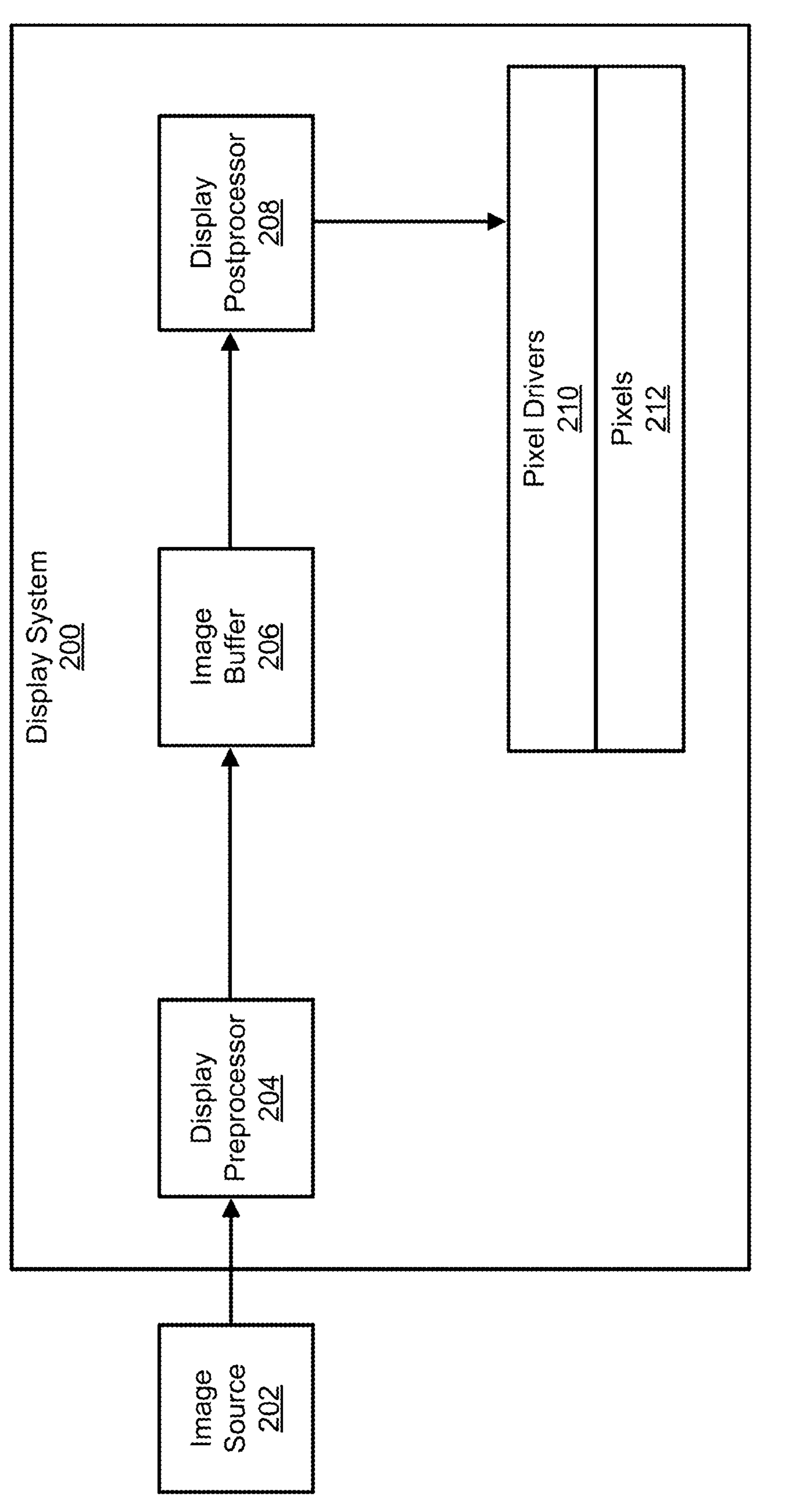
FIG. 2A shows an illustrative implementation of the display system of FIG. 1 in accordance with principles described herein.
Figure 2B:
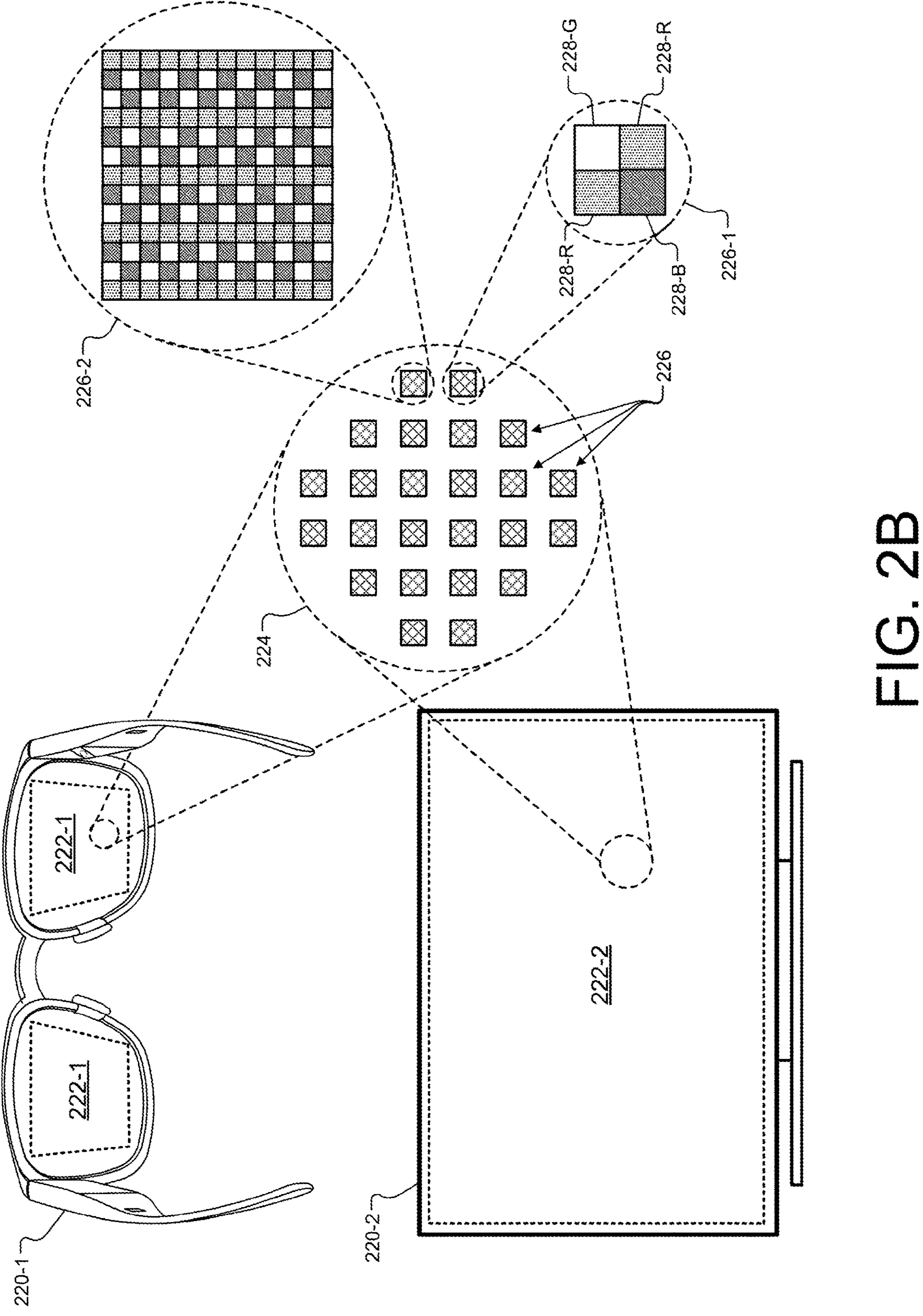
FIG. 2B shows certain aspects of various example image displays that may be implemented by the display system of FIG. 1 in accordance with principles described herein.
Figure 2C:
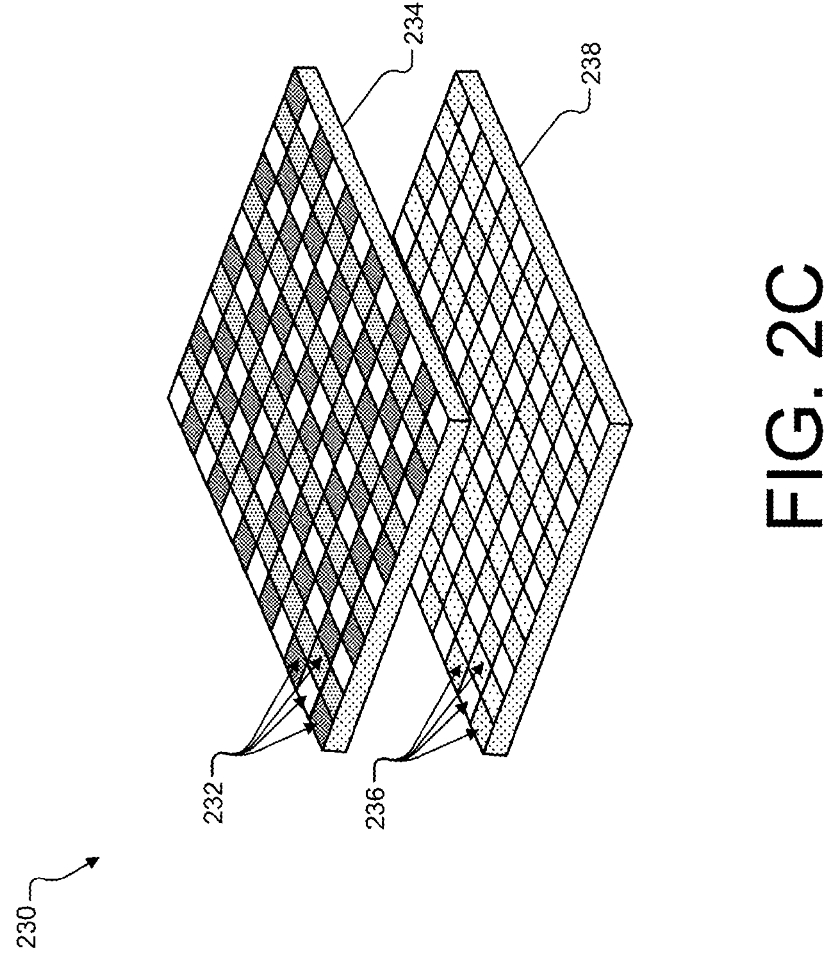
FIG. 2C shows certain aspects of an example image display that may be implemented by the display system of FIG. 1 in accordance with principles described herein.

Image displays using a segmented backplane described herein (e.g., including an image display implemented by display system 100), may be implemented by various types of display systems and in connection with various display technologies. FIGS. 2A-2C will now be described to show examples of such display systems in operational contexts and to set forth certain technologies that may come into play in the implementations of these display systems. More specifically, FIG. 2A shows an illustrative implementation of display system 100, while FIGS. 2B and 2C show certain technological aspects of example image displays that may be implemented by display system 100 in accordance with principles described herein.

In FIG. 2A, a display system 200 receiving image data from an image source 202 will be understood to represent an illustrative implementation of display system 100. As shown, display system 200 includes a display preprocessor 204 that receives the image data (e.g., image data 112) from image source 202, an image buffer 206, a display postprocessor 208, and a set of pixel drivers 210 that drives a set of pixels 212.

Display system 200 may implement image displays that may be featured in a variety of different types of electronic devices. For example, relatively large image displays implemented by display system 200 may be included in devices such as personal computers (e.g., laptops, desktop monitors, etc.) and televisions, smaller image displays implemented by display system 200 may be included in devices such as mobile devices (e.g., smartphones, tablets, electronic reading devices, etc.), and even smaller image displays implemented by display system 200 may be included in devices such as smart watches, augmented reality glasses (or other extended reality headsets), or other wearable or ultra-portable devices.

FIG. 2B shows certain aspects of a few such image displays that may be implemented by a display system such as display system 200 (which itself is an implementation of display system 100).

A first illustrative device 220-1 is shown to be implemented as a pair of augmented reality glasses that is configured to display content on a pair of display panels 222-1 associated with the lenses of the glasses. While not explicitly shown in FIG. 2B, it will be understood that an implementation of display system 200 may be built into the frames of device 220-1 (e.g., on the temple of the glasses or within the bridge, rims, or end pieces of the glasses, etc.) and waveguides built into the lenses may carry emitted light to be displayed to the user in front of his or her eyes on display panels 222-1.

In this type of example, the display system serves as a heads-up display system that is configured to pass through a view of a surrounding environment for any subset of pixels (from the total set of all available pixels) that is not being driven during any particular time period. In other words, empty portions of the display panels in this example may appear invisible to allow the user to see the environment around them and to view content on the panels as being overlaid onto objects in that environment. As has been mentioned, content configured for presentation on a heads-up display such as implemented by device 220-1 may tend to be relatively sparse (i.e., having a low fill-factor) by the nature of the use case for which it is intended. For example, information may be presented around the edges of display panels 222-1 while generally leaving an open, transparent area in the middle of the screen free to pass through a view of the environment and to facilitate the user in navigating the environment.

A second illustrative device 220-2 is shown to be implemented as a television or computer monitor that is configured to display content on a screen 222-2. In this type of display device, the implementation of display system 200 may be built into a chassis of the television or computer monitor (e.g., behind screen 222-2). While screen 222-2 is shown to be a rectangular viewing panel (as may be typical for this type of display device), it will be understood that image displays may come in a variety of shapes, including certain shapes that are non-rectangular, disjointed (i.e., multi-part), multi-dimensional (rather than a 2D array of pixels), and so forth. For example, display panels 222-1 illustrate a non-rectangular image display example.

A circular display sample 224 shown to either be from a display panel 222-1 or from screen 222-2 is illustrated to include a plurality of picture elements (pixels) referred to as pixels 226. As mentioned above, it will be understood that the hardware for these picture elements (e.g., implementations of pixels 108 or pixels 212 described above) may be implemented in any suitable location such as on the frame of the glasses device 220-1 or behind a glass screen of television device 220-2. Regardless of this detail, however, the viewer using either of these devices may perceive pixels 226 of sample 224 at the locations shown on the display panel 222-1 and/or the screen 222-2, though it will be understood that sample 224 is not necessarily drawn to scale.

Pixels 226 may be organized or positioned into an N×M array, with N being the number of rows of pixels in the array and M being the number of columns of pixels in the array. For small image displays, examples of array sizes (N, M) may be (10, 10), (100, 100), or the like, with each pixel 226 in the array having itself an array or grid of light emitting elements 228 (e.g., light emitting elements 228-R. 228-G. and 228-B, which will be described in more detail below and may also be referred to as pixels corresponding to particular color components or as pixel components of the larger pixel 226). For larger image displays, examples of array sizes may include (500, 500), (1000, 1000), (5000, 5000), (10000, 10000), or the like, again with each pixel 226 in the array having itself an array or grid of pixel components or light emitting elements 228. In some implementations, N and M may be different (to form a rectangular, non-square array such as a 1080×1920 full high-definition array or another array of a standard resolution). Alternatively, as mentioned above, the array may be of a different, non-rectangular shape.

Pixels 226 in sample 224 may be implemented in any suitable way and/or by any suitable number of light emitting elements 228 (i.e., color-specific pixel components). Two particular examples of pixels 226 are shown in FIG. 2B as pixel 226-1 and pixel 226-2. It will be understood, however, that each pixel 226 in a given display would be similar or identical and that the specific examples of pixels 226-1 and 226-2 would generally be employed in different image displays.

In pixel 226-1, FIG. 2B shows an example of a pattern or mosaic of light emitting elements 228-R (a red pixel component), 228-G (a green pixel component), and 228-B (a blue pixel component). In this example, a portion of an array or grid of light emitting elements 228 that are part of a pixel is enlarged to show one particular pattern that may be used to implement a single pixel 226 (i.e., pixel 226-1 in this case). Specifically, this example shows three different types of light emitting elements 228 that each produce light of different colors, such as red light, green light, and blue light, for example. In some implementations, the pattern can include (as shown) twice as many light emitting elements that produce red light (i.e., light emitting elements 228-R) than those that produce green light (light emitting elements 228-G) or blue light (light emitting elements 228-B). In other implementations, the pattern could include a light emitting element that produces red light that is twice the size of those that produce green light or blue light (not shown), or a fourth type of light emitting element that produces light of fourth color (e.g., white light). Generally, the area of light emitting elements of one color can be varied relative to the area of light emitting elements of other color(s) to meet particular color gamut and/or power efficiency needs. The patterns and colors described in connection with FIG. 2B are non-limiting examples provided by way of illustration. A wide range of patterns and/or colors (e.g., to enable a specified color gamut in the display) may be available for the light emitting elements of a picture element. In certain implementations, additional light emitting elements (of any color) may be used in a particular pattern to provide redundancy.

For certain types of displays (e.g., light field displays), a single pixel 226 (e.g., sometimes referred to as a super-raxel in the context of light field displays) may include a larger array of light emitting elements than the four shown in the example of pixel 226-1. These light emitting elements may be monolithically integrated onto a same semiconductor substrate. For example, when the different types of light emitting elements are based on different materials (or different variations or compositions of the same material), each of these different materials may be compatible with the semiconductor substrate such that the different types of light emitting elements 228 (e.g., light emitting elements 228-R, 228-G, and 228-B) may be monolithically integrated with the semiconductor substrate. This may enable ultra-high-density arrays of light emitting elements 228 that are useful for ultra-high resolution image displays, extremely small image displays (such as implemented within a frame of a glasses device 220-1), light field displays, or the like.

An enlarged view of pixel 226-2 is shown in FIG. 2B to include an array of light emitting elements similar to the light emitting elements 228 described above in relation to pixel 226-1, only with more elements. The array of light emitting elements of pixel 226-2 may be a P×Q array, with P being the number of rows of light emitting elements in the array and Q being the number of columns of light emitting elements in the array. Examples of array sizes (P, Q) may include (5, 5), (10, 10). (12, 12), (20, 20), (25, 25), or the like. It will be understood that these sizes are given only as examples, and the array of light emitting elements for a given picture element need not be limited to square or rectangular shapes and can be based on a hexagonal shape or other suitable shapes instead.

Returning to FIG. 2A, a suitable image source 202 may provide image data (e.g., image data such as image data 112 described above) to display system 200 in any manner as may serve the particular type of display system that is implemented. For example, image source 202 may provide video data representing a particular movie or television show for a display system 200 implemented as a television (e.g., device 220-2), while image source 202 may provide information about augmentations to be overlaid onto the external environment for a display system 200 implemented as augmented reality glasses (e.g., device 220-1).

Display preprocessor 204 and display postprocessor 208 may each be implemented as any processor, microprocessor, custom circuitry, hardwired digital logic, or the like (or any combination of these) as may serve a particular implementation. Display preprocessor 204 may be configured to perform operations on the image data after it is received from image source 202 and before it is buffered by image buffer 206. Display postprocessor 208 may be configured to then perform operations on the image data after it has been buffered by image buffer 206 and before it is used by the set of pixel drivers 210 to drive the set of pixels 212. The operations performed on the image data by display preprocessor 204 and/or display postprocessor 208 may include any suitable image processing operations, performed in any order as may serve a particular implementation. For instance, in various implementations the operations performed by display preprocessor 204 and/or display postprocessor 208 may include, without limitation, color correction operations, data translation operations (e.g., to transform the image data into a form more appropriate for the display technology being used), data compression and/or decompression operations, color reformatting operations (e.g., to convert from one color format to another, etc.), bit depth operations (e.g., to adjust the dynamic range of the data to better match the capabilities of the image display), and/or other image/color processing operations.

Image buffer 206 may be implemented as a set of memory (e.g., data registers, NAND memory, etc.) configured to store a certain amount of image data. In certain implementations, for example, image buffer 206 may include sufficient memory to store one or more entire frames of image data (e.g., an entirety of image 114). In other implementations, image buffer 206 may lack sufficient memory to store an entire frame. For instance, in an implementation that caps the amount of non-zero content displayed at any given time (e.g., to half of the available panel space of the image display), image buffer 206 may only include sufficient memory to store a partial frame of image data (e.g., only the non-zero content of image 114, which may be up to half of the size of the overall image). Various details and implications of these different types of implementations will be described and illustrated in more detail below.

Pixel drivers 210 may be implemented as any suitable circuitry configured to translate digital image data into an analog signal (e.g. a voltage, a current) that the pixel drivers may use to drive pixels 212, which may be implemented as light emitting diodes (LEDs) or other suitable light emitting devices. In various implementations, pixel drivers 210 may include current sources, voltage sources, multiplexer/demultiplexer circuitry, and so forth. Based on the analog signals driven by the pixel drivers 210, pixels 212 may convert the electrical energy into optical energy (i.e., light). In some implementations, pixel drivers 210 may correlate with pixels 212 on a one-to-one basis. That is, one pixel driver in the set of pixel drivers 210 may be associated with one entire pixel of the set of pixels 212 or one pixel component (i.e., a certain color for the pixel), a different pixel driver in the set of pixel drivers 210 may be associated with another pixel of the set of pixels 212 (or with another pixel component), and so forth. In other implementations, pixel drivers 210 may be configured to drive pixels in a row/column scheme by, for example, activating horizontal and vertical lines associated with the pixels (e.g., activating a particular row by a row driver, activating a particular column by a column driver, etc.).

In some implementations, pixel drivers 210 may provide analog values to drive the respective pixels 212, such as voltages or currents with a range of possible values (e.g., higher values of voltage or current to drive pixels brighter, lower values of voltage of current to drive pixels dimmer, etc.). In other implementations, pixel drivers 210 may be configured to control the brightness of pixels 212 by means other than analog values. For example, a pulse-width modulation (PWM) scheme may be employed to use time as the varying value that controls the brightness of each pixel or pixel component. In this type of example, a set value of voltage or current may be turned on and off rapidly (e.g., over several cycles per frame time period) to create an effect of the pixel being at maximum brightness (on for the entire time period), at minimal brightness (on for only one cycle during the time period, off for the remainder), or somewhere in between (on for more than one cycle but off for at least one).

As suggested by the adjacent rectangles depicting the sets of pixel drivers 210 and pixels 212 in FIG. 2A, pixels 212 may be arranged in a two-dimensional plane and pixel drivers 210 may be positioned directly behind the pixels 212, such that each pixel (or, more particularly, each pixel component of the various colors red, green, and blue) may be driven by an adjacent, corresponding pixel driver.

To illustrate, FIG. 2C shows an exploded view 230 of a grid (or array) of pixel components 232 (e.g., similar to light emitting elements 228-R, 228-G, and 228-B described above) disposed on a pixel plane 234. Directly behind pixel plane 234, a corresponding grid of pixel drivers 236 is shown to be disposed on a driver plane 238, with pixel drivers 236 corresponding to pixel component 232 on a one-to-one basis. It will be understood that appropriate optics (not explicitly shown in FIG. 2C) may then be arranged on the other side of pixel plane 234 to facilitate the light emitted by each pixel to travel to the eyes of viewers in a desirable way. For example, lenses, light guides, gratings, filters, and/or other suitable optics may be employed as may serve a particular implementation.

As shown (and as mentioned above), multiple pixels (and pixel components) may be monolithically integrated on a same semiconductor substrate. That is, multiple pixels can be fabricated, constructed, and/or formed from one or more layers of the same or different materials disposed, formed, and/or grown on a single, continuous semiconductor substrate. While the example shown in FIG. 2C shows a portion of a large, monolithic array of pixel components, however, it will be understood that other implementations may involve more limited arrays of pixel components (e.g., a single pixel such as pixel 226-1 with four pixel components) or even monochrome pixels that include only a single pixel component on a semiconductor substrate (e.g., discrete LEDs or the like).

Figure 3:
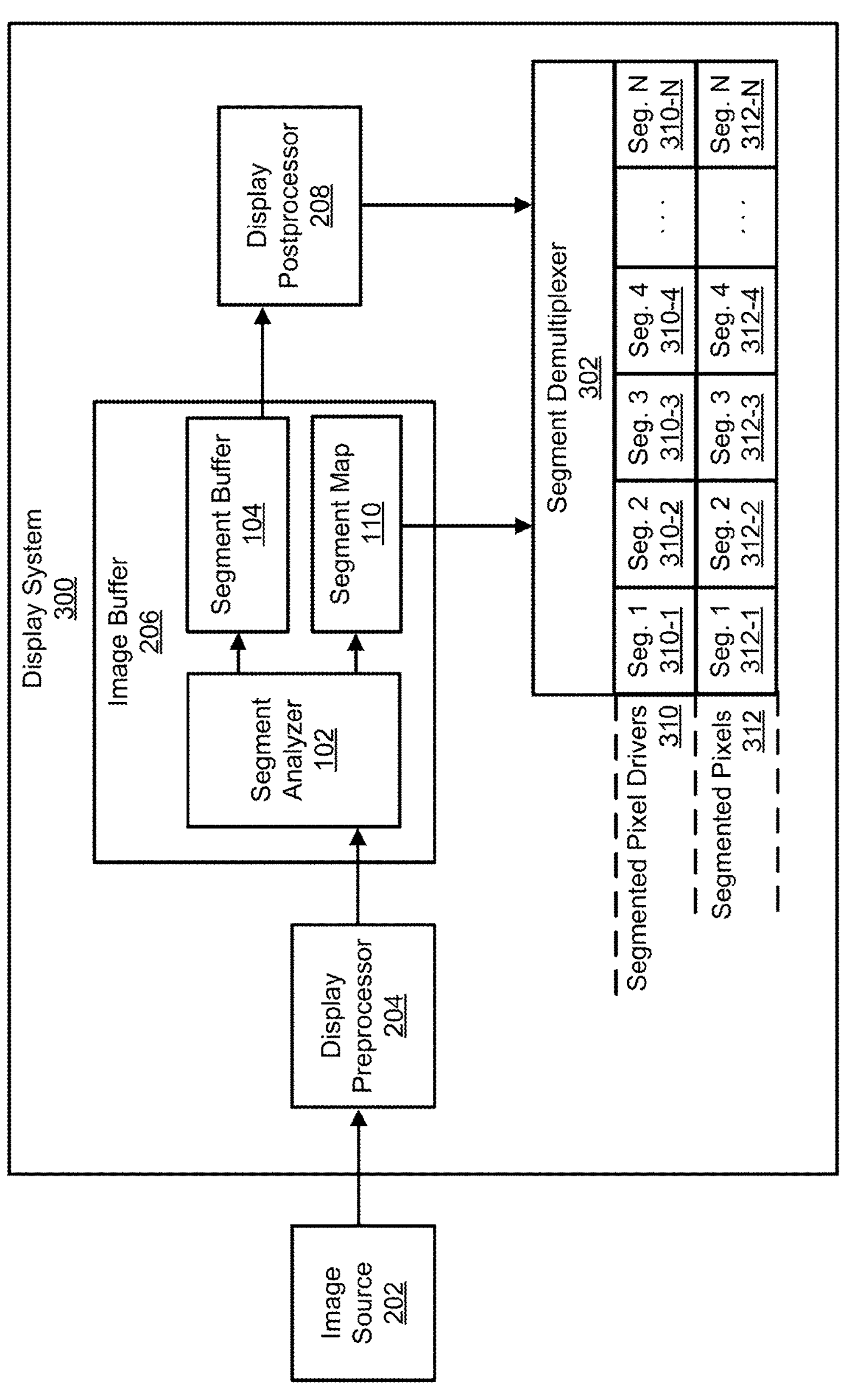
FIG. 3 shows another illustrative implementation of the display system of FIG. 1 in accordance with principles described herein.

As has been described, image displays using segmented backplanes may provide technical benefits such as power, memory, processing, and other resource efficiencies at various points within a display system. To further illustrate how and where these efficiencies and benefits may arise, FIG. 3 shows a display system 300, which will be understood to represent (like display systems 100 and 200 described above) another display system featuring an image display that uses a segmented backplane in accordance with principles described herein. Similar to display system 200 described in relation to FIG. 2A, display system 300 is shown to receive image data from image source 202, and to perform image data processing using both a display preprocessor 204 and a display postprocessor 208 that immediately precede and follow image data buffering (temporary storage) by an image buffer 206.

In display system 300, however, image buffer 206 is shown to explicitly implement certain components that were described in relation to display system 100 of FIG. 1. Specifically, image buffer 206 is shown to include: 1) a segment analyzer 102 that receives image data from display preprocessor 204, 2) a segment buffer segment buffer 104 that buffers image data analyzed by segment analyzer 102 prior to the data being sent to display postprocessor 208, and 3) a segment map 110 that is managed based on the analysis performed by segment analyzer 102 and that informs how segment buffer 104 stores the data for each incoming image.

Each of these components of image buffer 206 may be configured to perform operations similar or identical to those described above in relation to FIG. 1. For example, given image data representing an image that is to be displayed during a time period (e.g., received from display preprocessor 204), the segment analyzer 102 implemented in image buffer 206 may be configured to manage segment map 110 such that segment map 110 distinguishes a first portion of the image data from a second portion of the image data, the first portion corresponding to an active segment of the image (containing non-zero content) and the second portion corresponding to an empty segment of the image (without non-zero content). The segment buffer 104 of image buffer 206 may include segment buffer memory configured to store, based on segment map 110, at least the first (active) portion of the image data. As will be described in more detail below, it may also store the second (empty) portion of the image data in certain implementations.

This segment buffer memory may be further configured to send segment map 110 and/or the first portion of the image data to a set of pixel drivers. More particularly, as shown, a segment demultiplexer 302 associated with (e.g., integrated with or otherwise included as part of the pixel drivers) may receive segment map 110 and buffered image data (e.g., after the data has been further processed by way of display postprocessor 208 in certain implementations). Based on segment map 110, segment demultiplexer 302 may ensure that the proper image data (associated with the various active and/or empty segments that have been analyzed and encoded into the segment map for a given image) is sent to and used by the proper pixel drivers of a set of segmented pixel drivers 310.

Segmented pixel drivers 310 may be similar to the set of pixel drivers 106 described above. However, as is shown more explicitly in FIG. 3, these pixel drivers may be segmented (i.e., grouped by segment) in a way that was not previously shown. For example, a first subset of pixel drivers 310-1 is shown to serve a first segment ("Seg. 1"), a second subset of pixel drivers 310-2 is shown to serve a second segment ("Seg. 2"), and so forth for each of the other subsets of pixel drivers 310-3, 310-4, up to 310-N.

Each of the subsets of pixel drivers 310-1 through 310-N are shown to be associated with a corresponding subset of pixels that the pixel drivers may drive. Specifically, a set of segmented pixels 312 is shown to include a first subset of pixels 312-1 that correspond to the first segment ("Seg. 1") and are driven by the first subset of pixel drivers 310-1, a second subset of pixels 312-2 that correspond to the second segment ("Seg. 2") and are driven by the second subset of pixel drivers 310-2, and so forth for each of the other subsets of pixels 312-3, 312-4, up to 312-N.

With the segment analysis being performed and encoded within the data of segment map 110, and with the segmented configuration of pixel drivers and their corresponding pixels, it may be apparent how various efficiencies may be gained by the system.

For example, a first efficiency arises as segment demultiplexer 302 uses segment map 110 and image data received from display postprocessor 208 to direct the set of segmented pixel drivers 310 to cause the set of segmented pixels 312 to display the image during the time period. Specifically, segment demultiplexer 302 may cause the image to be displayed by driving a first subset of the set of pixels (e.g., the subset of pixels 312-1, which may be associated with the active segment in this example), and without driving a second subset of the set of pixels (e.g., the subset of pixels 312-2, which may be associated with the empty segment in this example). In this way, only subsets of pixel drivers and corresponding subsets of pixels that are associated with active segments (a relatively low portion of the overall pixel drivers and pixels for images having relatively low fill-factors) even need to be activated or draw any power at all when the image is displayed. In other words, each subset of the set of segmented pixel drivers 310 corresponding to empty segments (along with each corresponding subset of the set of segmented pixels 312) may be configured to remain in an inactive state during the time period when the set of pixels displays the image, thereby producing significant power savings as compared to if all of these pixel drivers were active.

A second efficiency may also arise in implementations where image buffer 206 (e.g., the segment buffer memory of segment buffer 104) abstains from sending image data associated with empty segments to segment demultiplexer 302 and/or to display postprocessor 208. For example, in these implementations, segment demultiplexer 302 and the set of segmented pixel drivers 310 may cause the set of segmented pixels 312 to display the image during the time period not only without driving subsets of the set of pixels associated with empty segments, but also without fetching these portions of the image data from the segment buffer. By forgoing this memory fetching, significant power efficiencies associated with data movement may be achieved. Moreover, in implementations where the fetching of the empty portions of image data would have been moved through display postprocessor 208, additional time, power, and processing resources associated with postprocessing that data may further be freed up, leading to additional efficiencies. In this way, lower fill factors of images may result in less data movement and less data processing, along with the pixel driver power savings already mentioned.

A third efficiency may also arise in implementations where image buffer 206 (e.g., the segment buffer memory of segment buffer 104) abstains not only from sending image data associated with empty segments but also from even storing or buffering such empty portions of image data at all. For example, in these implementations, segment buffer 104 may be configured to store the active portions of the image data (portions associated with active segments of the image) without also storing empty portions of the image data (portions associated with empty segments of the image). By forgoing this buffering, the power efficiencies resulting from the fetching and post processing may be enhanced by some additional power savings associated with the buffering, as well as by memory efficiencies. For example, as will be described and illustrated in more detail below, certain implementations may be configured to only support low fill-factor content and may reduce the memory storage requirements below the capability of even having to buffer an entire image at a time.

Figure 4A:
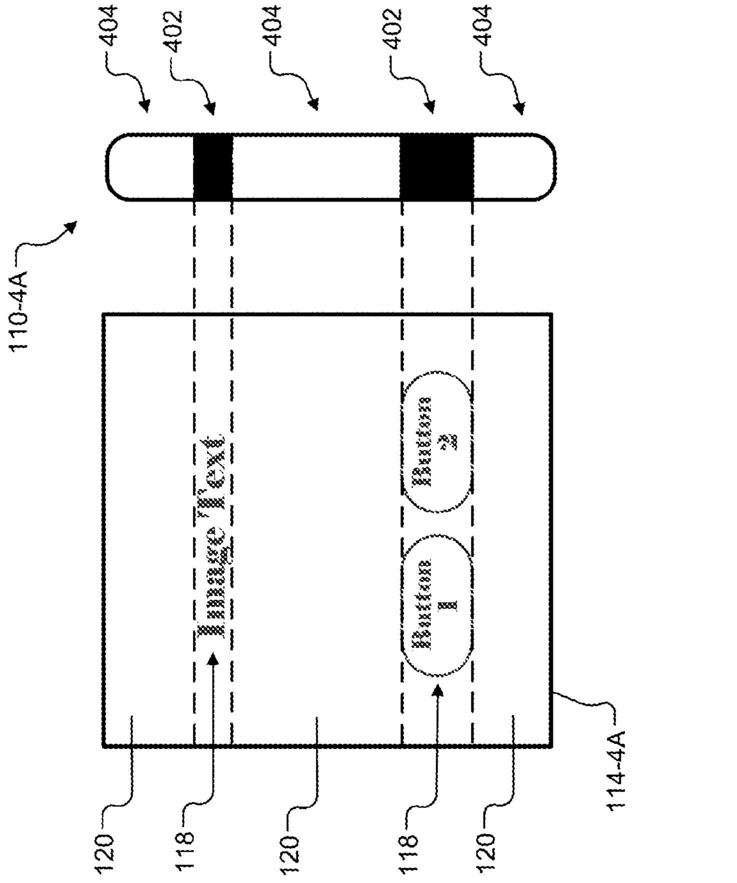
FIG. 4A shows a first example of how an image may be segmented for display by a segmented backplane in accordance with principles described herein.
Figure 4B:
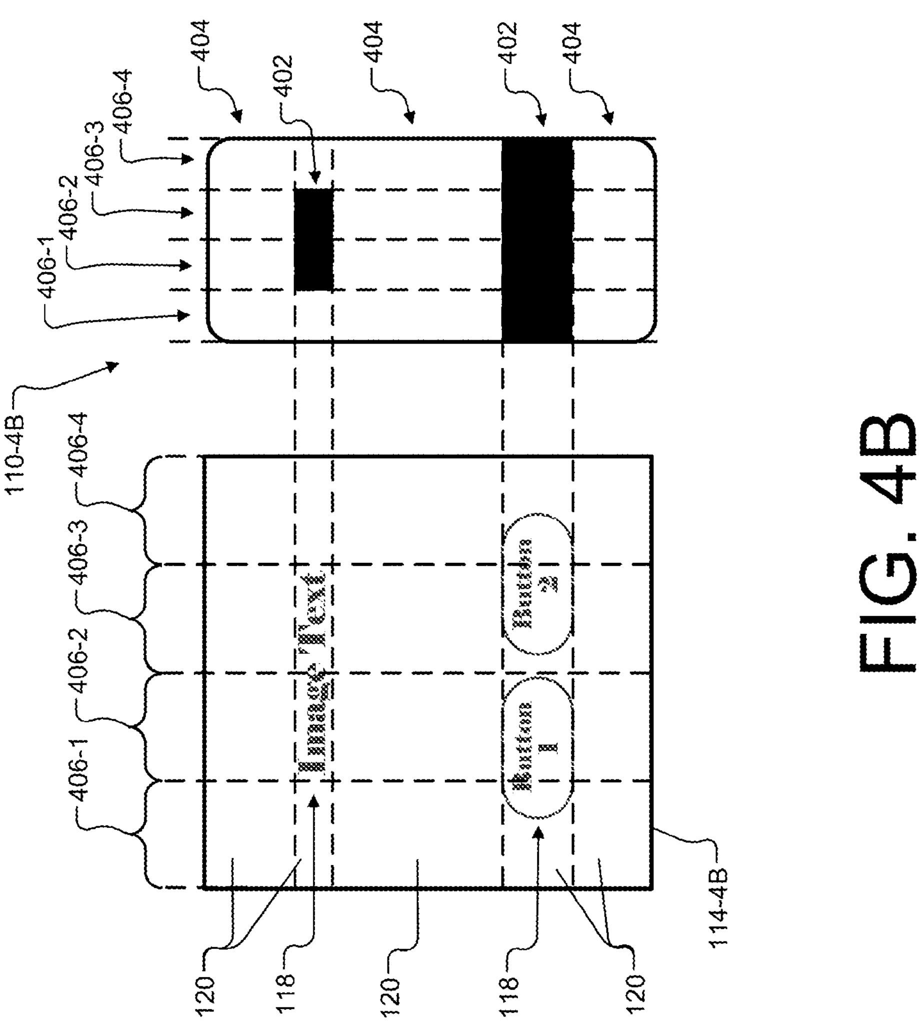
FIG. 4B shows a second example of how an image may be segmented for display by a segmented backplane in accordance with principles described herein.
Figure 4C:
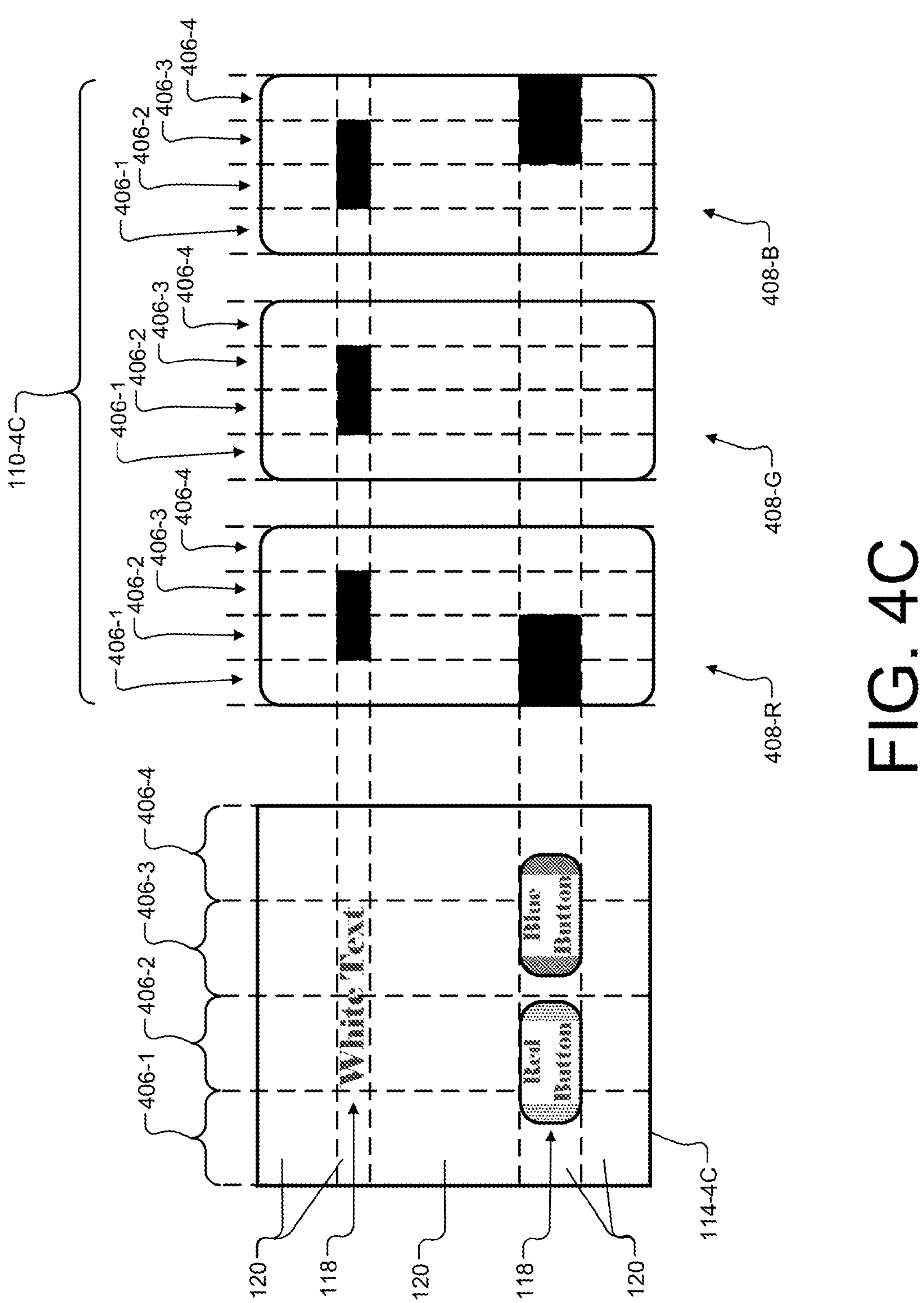
FIG. 4C shows a third example of how an image may be segmented for display by a segmented backplane in accordance with principles described herein.
Figure 5A:
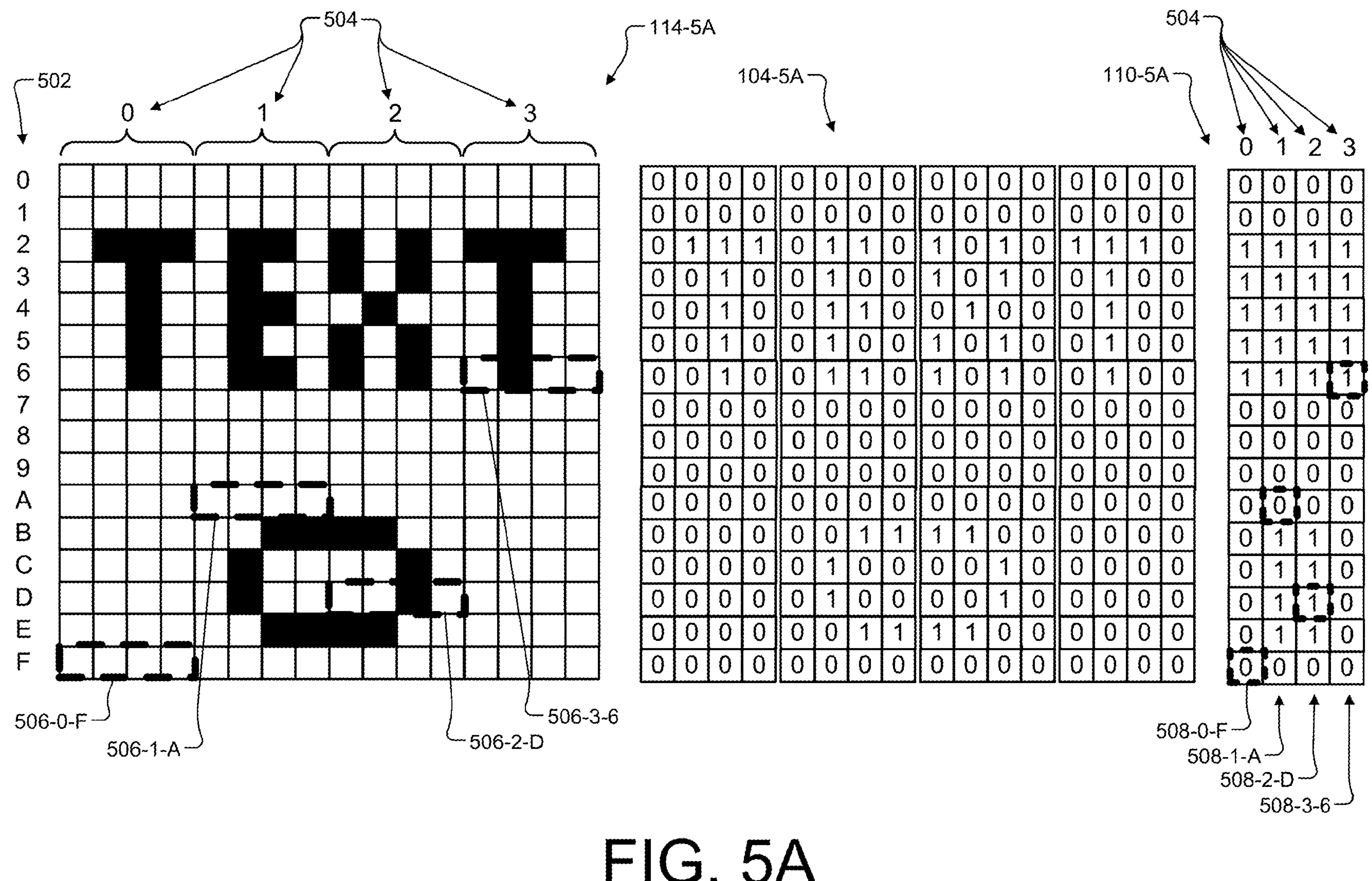
FIG. 5A shows a first example of how a segment buffer may be implemented and mapped for a segmented backplane in accordance with principles described herein.
Figure 5B:
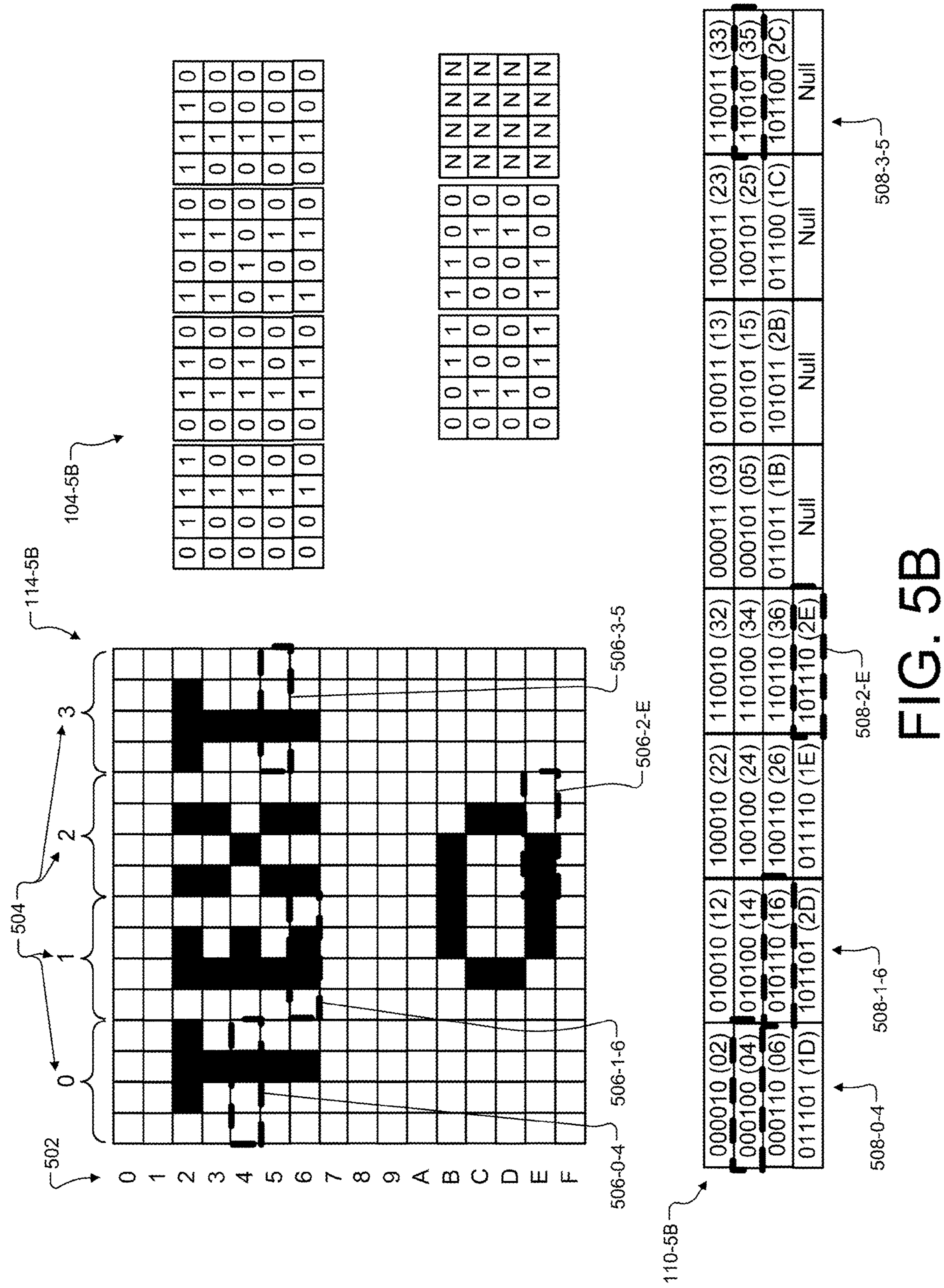
FIG. 5B shows a second example of how a segment buffer may be implemented and mapped for a segmented backplane in accordance with principles described herein.

Having shown and described illustrative architectural principles for display systems implementing image displays that use a segmented backplane and having laid out various technical benefits and effects that arise from the technical solutions that these systems provide, certain details regarding different ways of implementing aspects of these systems will now be described and illustrated in relation to FIGS. 4A-4C and 5A-5B. Specifically, FIGS. 4A-4C show different ways that images may be segmented for display by a corresponding segmented backplane to optimize the benefits for different types of images and/or displays. FIGS. 5A-5B then show different ways that segment buffers may be implemented and mapped for segmented backplanes having different designs or display parameters.

In FIG. 4A, the same image 114 described above in relation to FIG. 1 is shown again and labeled as image 114-4A (to distinguish this instance of the image from other similar instances illustrated in other FIGS. 4B, 4C, 5A, and 5B below). As described above, this image 114-4A depicts non-zero content 118 that includes some text ("Image Text") and two buttons ("Button 1" and "Button 2"). As a relatively low fill-factor image, image 114-4A is also shown to include relatively large empty areas 120 that will be understood to be devoid of non-zero content. It is noted that in this and other figures of this disclosure, whitespace is used to represent empty areas without non-zero content, while black is used to represent non-zero content (which may be colored as indicated in the description). It will be understood that for some displays, empty content could actually be black or transparent while non-zero content could be white or colored.

As a 2D matrix of white and black pixels, it will be understood that image 114-4A contains a plurality of rows and columns, even though these rows and columns may be too small to label individually. Regardless, in this example, image 114-4A will be understood to be divided into various segments that each take up a full row. As such, each active segment (i.e., each row corresponding to non-zero content 118), as well as each empty segment (i.e., each row corresponding to empty areas 120) corresponds to a different entire row of the plurality of rows.

A representation of a segment map for image 114-4A is illustrated in FIG. 4A as segment map 110-4A (again, to distinguish this instance of the segment map from other similar instances illustrated in other FIGS. 4B, 4C, 5A, and 5B below). While individual rows are too small to be labeled, this mapping is illustrated alongside image 114-4A to show how active segments 402 (associated with non-zero content 118) are represented in segment map 110-4A in one way (e.g., using black shading in this example) while empty segments 404 (associated with empty areas 120) are represented in segment map 110-4A in a different way (e.g., using white, or without shading, in this example). While the segment map 110-4A depicted in FIG. 4A provides a graphical representation of a segment map for illustrative purposes, it will be understood that this map may be stored and represented in memory of a display system in any suitable way. For example, if image 114-4A includes 100 rows, segment map 110-4A may be implemented by a memory space with 100 bits of storage, each associated with a different segment (i.e., a different entire row in this example) and storing, for instance, a '0' if the segment is empty or a '1' if the segment is active.

With the particular low fill-factor of the content of image 114-4A, FIG. 4A shows how significant efficiencies may be gained by a segmented backplane that only allocates resources for the shaded portions (active segments 402) of segment map 110-4A and not for the unshaded portions (empty segments 404). However, it is possible to imagine content with a similarly low fill-factor as the content of 114-4A but that nonetheless would not benefit from the same efficiencies. For instance, even if image 114-4A had the same or less non-zero content 118 as currently shown, even one vertical column of content (e.g., a thin line from the top of the image to the bottom) would eliminate all of the empty segments 404 in segment map 110-4A despite much of the image still being empty. To eliminate this type of potential vulnerability (e.g., in anticipation of images with long vertical lines that may likely to be received for a certain use case), each row may be divided into multiple parts, such that active segments and empty segments of the image each correspond to less than an entire row of the plurality of rows of the image.

To illustrate this type of partial-line segmentation and how it differs from the full-line (or entire-line) segmentation illustrated in FIG. 4A, FIG. 4B shows an image 114-4B that is identical to image 114-4A but that is partitioned vertically into several segment groups 406 (e.g., four segment groups 406-1, 406-2, 406-3, and 406-4 in this example).

A segment map 110-4B is shown in FIG. 4B to map multiple segments per row of the image in accordance with the segment groups 406. Segment map 110-4B is more complex and will require more memory than segment map 110-4A, but, based on the nature of the content, may result in additional efficiencies for some implementations. As shown, much of the segment mapping here may be similar to the segment mapping illustrated in FIG. 4A. For example, the entire rows of empty areas 120 above the text, between the text and the buttons, and below the buttons are still all mapped as empty segments 404, while the entire rows of non-zero content 118 on which buttons are depicted are still mapped as active segments 402. However, when it comes to the non-zero content 118 of the text in the image itself, FIG. 4B shows how the partial-line segmentation may provide additional efficiencies. As shown in segment map 110-4B, all of the rows of text in segment groups 406-2 and 406-3 are shaded black and labeled as active segments 402. However, for segment groups 406-1 and 406-4 of these same rows, 110-4B remains unshaded white, indicating that segments on these rows that are not displaying any portion of the text do not need to be buffered, processed, and/or displayed. Even if a vertical line extended all the way from the top of the image, this type of segmentation would allow for many areas of the image display to still gain efficiencies described herein.

While four segment groups are illustrated in this example, it will be understood that any number of segment groups may be used as may serve a particular implementation, all the way down to a segment group that includes only a single column of pixels (i.e., a group of one). However, while a large number of segment groups may be advantageous for being able to distinguish active and empty segments with high precision and resolution, a tradeoff will be considered that larger numbers of segment groups (and the larger number of pixel segments that results) require more processing to map, more memory to store the larger segment maps, and so forth. Accordingly, based on the nature of the content that is anticipated, this tradeoff may be managed to find a balance that optimizes the resource savings for a particular implementation. In this example, the four segment groups 406 are suitable for illustrative purposes and may be fairly (though perhaps not completely) optimal for the content of image 114-4B.

In the implementations of FIGS. 4A and 4B, each pixel is treated as a full (white) pixel without accounting for pixel components that may make up the pixel or efficiencies that may be unlocked by accounting for color of the image. As such, given an image 414-4A or 414-4B that includes a red image component, a green image component, and a blue image component, the analysis illustrated in both FIGS. 4A and 4B was a color-agnostic analysis that distinguished the active portions of the image data from the empty portions of the image data without regard for color (i.e., based on non-zero content being contained in any of the red image component, the green image component, or the blue image component for the active segment). While this color-agnostic approach may be optimal for certain types of content (e.g., content that includes a large portion of white pixels driven by a combination of red, green, and blue), additional efficiencies may be achieved for other types of content scenarios (e.g., content that includes large portions of individual color components and that is empty of others). For example, assuming again an image that is defined in terms of a red image component, a green image component, and a blue image component, a display system may opt for a color-aware analysis instead of the color-agnostic analysis described above.

A color-aware analysis may be performed separately for each of the red image component, the green image component, and the blue image component. As such, the segment map resulting from the color-aware analysis may include separate segment map components such as a red segment map component based on the color-aware analysis for the red image component, a green segment map component based on the color-aware analysis for the green image component, and a blue segment map component based on the color-aware analysis for the blue image component.

To illustrate this type of color-aware approach and how it differs from the color-agnostic approach illustrated in FIGS. 4A and 4B, FIG. 4C shows an image 114-4C that is similar to images 114-4A and 114-4B but that indicates more information about the colors of the content. Specifically, the text content is indicated to be white ("White Text"), the left button is indicated to be red ("Red Button"), and the right button is indicated to be blue ("Blue Button"). As with image 114-4B, image 114-4C is again shown to be partitioned vertically into the four segment groups 406 described above.

A segment map 110-4C is shown in FIG. 4C to include three different segment map components 408 including a segment map component 408-R (associated with a red image component of image 114-4C), a segment map component 408-G (associated with a green image component of image 114-4C), and a segment map component 408-B (associated with a blue image component of image 114-4C). Each of the segment map components 408 of segment map 110-4C is shown to map partial-line segments across the various segment groups 406 in a similar way as described above for segment map 110-4B. However, these map components are further configured to distinguish non-zero and empty segments with regard to the various red, green, and blue color components. As a result, segment map 110-4C shows that the non-zero content 118 associated with the white text results in active segments (shaded black portions in segment groups 406-2 and 406-3) across all three segment map components 408 for the three colors (since white text would be displayed by a combination of red, green, and blue pixel components). At the same time, segment map 110-4C shows that the non-zero content 118 associated with the red button results in active segments (shaded black portions in segment groups 406-1 and 406-2) only in segment map component 408-R, while the non-zero content 118 associated with the blue button results in active segments (shaded black portions in segment groups 406-3 and 406-4) only in segment map component 408-B. No active segments corresponding to the buttons are mapped in segment map component 408-G.

For colored content such as the content of image 114-4C, the unshaded portions of the segment map components 408 of segment map 110-4C illustrate how efficiencies may be gained by a color aware analysis utilized by certain implementations. For example, a pixel driver associated with only a certain color (e.g., green) of a particular segmentation of pixels (e.g., a segment where the red or blue buttons are) could remain in an inactive state during the time period that image 114-4C is displayed, thereby saving power and other resources that would be used if this pixel driver were to be activated.

As has been mentioned, segment buffers for image displays using segmented backplanes may be implemented in different ways to achieve different benefits for different types of use cases. For example, certain use cases may involve display image content that includes low fill-factor images often or occasionally, but also includes higher fill-factor images (e.g., images in which most or all of the pixels must be driven at once to properly display the image). A television or computer monitor would likely be used for this type of use case, for example, since these devices commonly display full screen images. Conversely, other use cases may involve display image content that is limited by design to only display low fill-factor images (and ensuring that high fill-factor of full images are never displayed). Certain augmented reality viewers (e.g., augmented reality glasses) may be used for this type of use case, for example, since it may be desirable to ensure that much or most of the display panel is usually left blank to allow the viewer to see and engage with the environment around them. Depending on design objectives for a certain implementation and what types of content and/or use cases are targeted, there may be different ways that segment buffers may be implemented and mapped for segmented backplanes described herein.

To illustrate, FIG. 5A shows a segment buffer 104-5A (so named to distinguish this instance of the segment buffer 104 from a similar instance illustrated in 5B below) that includes memory sufficient to store an entirety of the image data representing an image that is to be displayed (e.g., for use with the former type of use case described above). FIG. 5A further shows an image 114-5A (a simplified version of other instances of image 114 described above that more clearly shows each individual pixel) and a segment map 110-5A that includes different single-bit entries for each segment of the image (e.g., a first single-bit entry for an active segment, a second single-bit entry for an empty segment, etc.).

Image 114-5A is shown to include a plurality of rows 502 (i.e., 16 rows in this example) labeled along the side using hexadecimal digits 0-F. These rows may be referred to as rows 502-0 through 502-F. Each row 502 of pixels includes 16 pixels, making image 114-5A a 16×16 square for this example. However, rather than numbering each of the 16 columns in the grid, four segment groups 504 that are each four pixels wide are labeled 0-3 along the top of the image. These segment groups may be referred to as segment groups 504-0 through 504-3. Each segment of the image in this example will be understood to include four contiguous pixels on a same row. A few example segments are outlined with bold dashed lines in FIG. 5A to illustrate, though it will be understood that these are arbitrary examples only and that there are 60 other segments shown along with the 4 segments that are actually labeled in the figure. For convenience, a labeling scheme is used herein that indicates the segment group and the row in a hyphenated format. Thus, for example, a first segment 506-0-F is shown to refer to the 4-pixel segment of segment group 504-0 and row 502-F, a second segment 506-1-A is shown to refer to the 4-pixel segment of segment group 504-1 and row 502-A, a third segment 506-2-D is shown to refer to the 4-pixel segment of segment group 504-2 and row 502-D, and a fourth segment 506-3-6 is shown to refer to the 4-pixel segment of segment group 504-3 and row 502-6. Of these illustrative segments 506, segments 506-2-D and 506-3-6 are both active segments since they include at least one (shaded black) pixel representing non-zero content. Conversely, segments 506-0-F and 506-1-A are both empty segments since neither includes any non-zero content (all the pixels in each of these are unshaded white pixels). While other segments could be similarly labeled and referenced, these four will be sufficient for purposes of illustration in the following description.

As mentioned above, segment buffer 104-5A in this example includes buffer space sufficient to contain data for the entirety of image 114-5A. For example, as shown, a single bit '0' or '1' is shown to be buffered in corresponding locations to image 114-5A within segment buffer 104-5A ('0' representing zero content and '1' representing non-zero content). While this binary scheme suffices for illustration here, it will be understood that, in certain implementations, multi-bit values may be stored at each memory location to represent brightness values for each color component. For example, each memory location could be configured to store an 8-bit red value, an 8-bit green value, and an 8-bit blue value corresponding to that particular pixel. In other implementations, other bit depths or formats could be used as may serve a particular implementation.

Segment map 110-5A shows the results of an analysis by an implementation of segment analyzer 102. Specifically, as shown, a single bit may be managed for each of the 64 segments in accordance with the 16 rows 502 and the four segment groups 504. Entries 508 of segment map 110-5A (also referred to as segment activity indicators) that correspond to each of the labeled segments 506 are similarly outlined (using bold, dashed boxes) and labeled in FIG. 5A. Specifically, as shown, an entry 508-0-F associated with segment 506-0-F is shown to be '0', indicating that this is an empty segment. An entry 508-1-A associated with segment 506-1-A is also shown to be '0', indicating that this too is an empty segment. In contrast, an entry 508-2-D associated with segment 506-2-D is shown to be '1', indicating that this is an active segment. And an entry 508-3-6 associated with segment 506-3-6 is also shown to be '1', indicating that this too is an active segment. The one-to-one mapping of segments 506 in image 114-5A to segmented groups of memory locations in segment buffer 104-5A to single-bit entries 508 in segment map 110-5A requires more memory than the implementation of FIG. 5B (described below) but is capable of buffering any amount of image data for an image, up to an entirety of image data for an entire image.

In contrast, FIG. 5B shows a segment buffer 104-5B that lacks memory sufficient to store an entirety of the image data representing an image that is to be displayed (e.g., for use with the latter type of use case described above). FIG. 5B further shows an image 114-5B (identical to image 114-5A) and a segment map 110-5B that includes different multi-bit entries for each segment of the image (e.g., a first multi-bit entry for an active segment, a second multi-bit entry for an empty segment, etc.).

Image 114-5B is shown to include the same plurality of rows 502 and segment groups 504 described above for image 114-5A. In this example, however, a different set of illustrative segments 506 are labeled than those labeled in FIG. 5A. Specifically, a first segment 506-0-4 is shown to refer to the 4-pixel segment of segment group 504-0 and row 502-4, a second segment 506-1-6 is shown to refer to the 4-pixel segment of segment group 504-1 and row 502-6, a third segment 506-2-E is shown to refer to the 4-pixel segment of segment group 504-2 and row 502-E, and a fourth segment 506-3-5 is shown to refer to the 4-pixel segment of segment group 504-3 and row 502-5. While these illustrative labeled segments are still chosen arbitrarily for illustrative purposes, it is noted that all of these segments are active segments, since this figure illustrates that only active segments are buffered and mapped in this type of implementation.

In contrast to segment buffer 104-5A, segment buffer 104-5B is shown to include potentially far fewer memory locations, since only image data associated with active segments may be buffered in this type of implementation. While the boxes representing the memory locations of 104-5B are still arranged in FIG. 5B to align with the rows and columns with which they correspond (similar to the arrangement in FIG. 5A), it will be understood that the missing memory locations (the various omitted boxes from FIG. 5A that all represented zero content of empty segments) are not just omitted from the figure but may indeed be absent from the segment buffer. A few unused memory locations (which may nevertheless have been allocated for use in the buffer but are not needed for the amount of non-zero content present in image 114-5B) are also shown to hold null values ('N'). As shown, and as has been mentioned, this example segment buffer may allocate far less memory than is allocated for the segment buffer of FIG. 5A, based on a design parameter that no more than a certain number or percentage of overall segments of the image are ever to be active in this implementation (e.g., no more than 50%, no more than 25%, etc.).

Segment map 110-5B then shows the results of an analysis by an implementation of segment analyzer 102. Specifically, as shown, a multi-bit value may be managed for each of the 28 active segments that have been identified in image 114-5B and buffered in segment buffer 104-5B. Since the one-to-one mapping of segments to entries described above is not available in this implementation, multi-bit values are used to indicate what part of the image each buffered segment corresponds to. In this example, each multi-bit value is encoded using a six-digit binary value (followed by a parenthetical hexadecimal value for readability). For example, segment map 110-5B indicates that the first segment of buffered memory in segment buffer 104-5B corresponds to location "000010 (02)" of image 114-5B, or, in other words, segment group 504-0 and row 502-2. The second segment of buffered memory in segment buffer 104-5B is then indicated to correspond to location "010010 (12)" of image 114-5B (segment group 504-1 and row 502-2), and so forth. As in FIG. 5A, bolded and dashed boxes representing entries 508 corresponding to the labeled segments 506 are shown in segment map 110-5B for illustrative clarity. Specifically, as shown, an entry 508-0-4 associated with active segment 506-0-4 is shown to correspond to location "000100 (04)" of the image; an entry 508-1-6 associated with active segment 506-1-6 is shown to correspond to location "010110 (16)" of the image; an entry 508-2-E associated with active segment 506-2-E is shown to correspond to location "101110 (2E)" of the image; and an entry 508-3-5 associated with active segment 506-3-5 is shown to correspond to location "110101 (35)" of the image.

The multi-bit mapping of active segments 506 buffered in segment buffer 104-5B to their respective locations in image 114-5B allows for the total amount of memory allocated for the display (the amount actually used or even the amount available in the memory device) to be reduced in comparison to the implementation described above in relation to FIG. 5A, though the tradeoff to be considered for this memory reduction is a limitation on how high of a fill-factor can be supported for the image being displayed.

Figure 6:
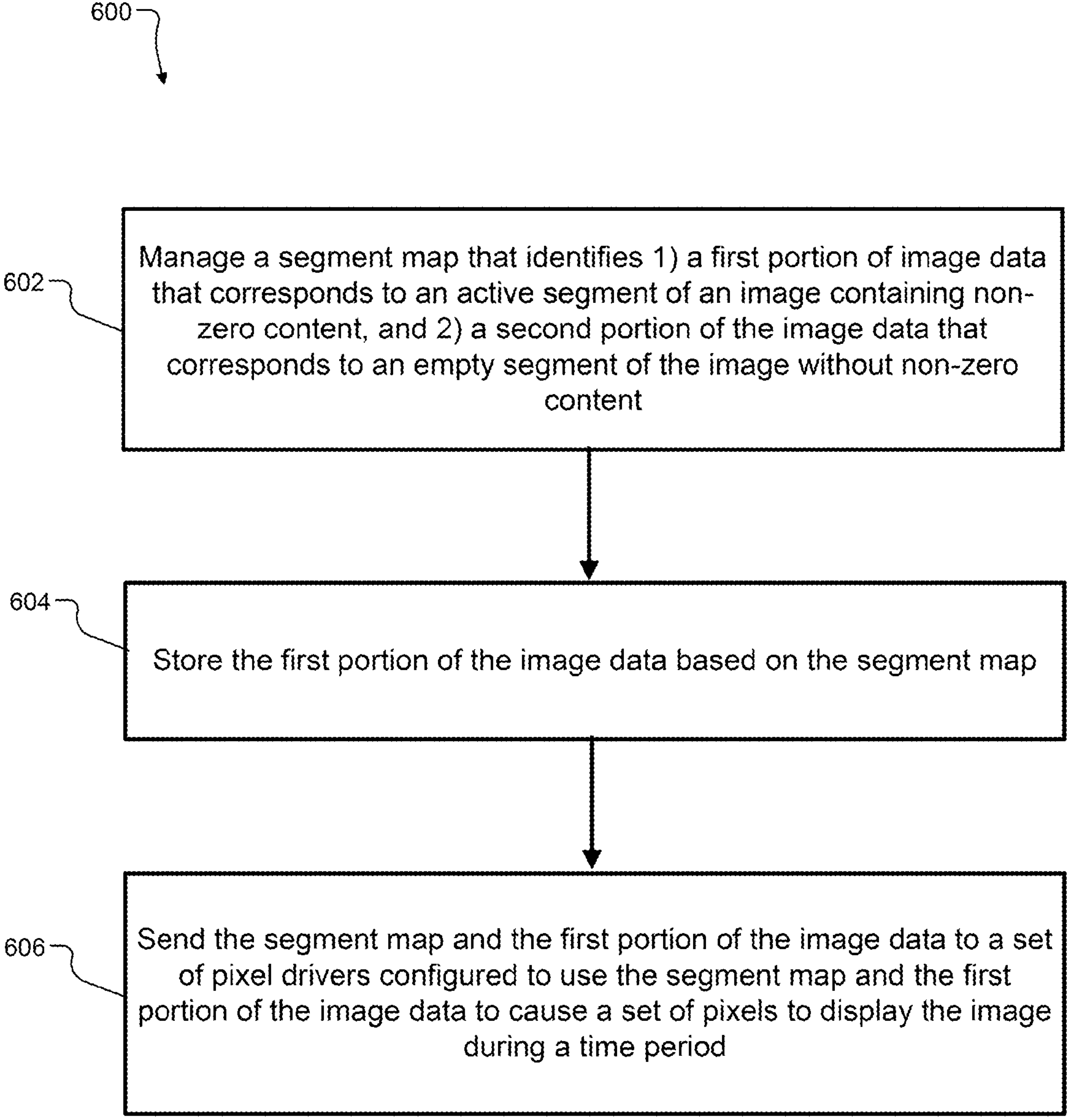
FIG. 6 shows an illustrative method to be performed by an image buffer included in a display system that implements an image display using a segmented backplane in accordance with principles described herein.

FIG. 6 shows an illustrative method to be performed by an image buffer included in a display system that implements an image display using a segmented backplane in accordance with principles described herein. While FIG. 6 shows illustrative operations 602-606 according to one implementation, other implementations may omit, add to, reorder, and/or modify any of the operations 602-606 shown in FIG. 6. In some examples, multiple operations shown in FIG. 6 or described in relation to FIG. 6 may be performed concurrently (e.g., in parallel) with one another, rather than being performed sequentially as illustrated and/or described. Each of operations 602-606 of method 600 will now be described in more detail as the operations may be performed by an implementation of display system 100 (e.g., display system 200, display system 300, etc.) and, more particularly, by an image buffer included in the display system (e.g., any implementation of image buffer 206 described herein).

At operation 602, the image buffer may manage (e.g., generate, produce, change, update, store, provide, etc.) a segment map that identifies, within image data representing an image that is to be displayed during a time period, both 1) a first portion of the image data that corresponds to an active segment of the image containing non-zero content, and 2) a second portion of the image data that corresponds to an empty segment of the image without non-zero content. This identification may include distinguishing the first portion from the second portion as has been described, and the segment map may be implemented in accordance with any of the implementations of segment map 110 described herein.

At operation 604, the image buffer may store, based on the segment map managed at operation 602, the first portion of the image data. In some implementations such as described above in relation to FIG. 5B, active portions of the image data such as the first portion may be all that the image buffer stores, while abstaining from storing empty portions of the image data such as the second portion. In other implementations such as described above in relation to FIG. 5A, both active and empty portions of the image data may be stored (though the empty portions may or may not be further processed, fetched, etc., as has been described).

At operation 606, the image buffer may send the segment map and the first portion of the image data to a set of pixel drivers configured to use the segment map and the first portion of the image data to cause a set of pixels to display the image during the time period. For example, as has been described, the set of pixel drivers may cause the set of pixels to display the image by driving a first subset of the set of pixels that is associated with the active segment, while not driving (i.e., without driving) a second subset of the set of pixels that is associated with the empty segment.

The following statements describe implementations of an image display using a segmented backplane:

1. A display system, comprising: a segment analyzer configured to perform an analysis of image data representing an image to be displayed during a time period, the analysis distinguishing: a first portion of the image data that corresponds to an active segment of the image containing non-zero content, from a second portion of the image data that corresponds to an empty segment of the image without non-zero content; a segment buffer configured to store, in accordance with a segment map based on the analysis, the first portion of the image data; and a set of pixel drivers configured to use the segment map and the first portion of the image data stored in the segment buffer to cause a set of pixels to display the image during the time period by driving a first subset of the set of pixels, the first subset associated with the active segment, and without driving a second subset of the set of pixels, the second subset associated with the empty segment.
2. The display system of any of the preceding statements, wherein: the image contains a plurality of rows; and the active segment and the empty segment of the image each correspond to less than an entire row of the plurality of rows.
3. The display system of any of the preceding statements, wherein: the image contains a plurality of rows; the active segment corresponds to a first entire row of the plurality of rows; and the empty segment corresponds to a second entire row of the plurality of rows.
4. The display system of any one of any of the preceding statements, wherein: the image includes a red image component, a green image component, and a blue image component; and the analysis is a color-agnostic analysis that distinguishes the first portion of the image data from the second portion of the image data based on non-zero content being contained in any of the red image component, the green image component, or the blue image component for the active segment.
5. The display system of any one of any of the preceding statements, wherein: the image includes a red image component, a green image component, and a blue image component; the analysis is a color-aware analysis performed separately for each of the red image component, the green image component, and the blue image component; and the segment map includes a red segment map component based on the color-aware analysis for the red image component, a green segment map component based on the color-aware analysis for the green image component, and a blue segment map component based on the color-aware analysis for the blue image component.
6. The display system of any one of any of the preceding statements, wherein a subset of the set of pixel drivers corresponding to the second subset of the set of pixels is configured to remain in an inactive state during the time period when the set of pixels displays the image.
7. The display system of any one of any of the preceding statements, wherein the set of pixel drivers causes the set of pixels to display the image during the time period without driving the second subset of the set of pixels and further without fetching the second portion of the image data from the segment buffer.
8. The display system of any one of any of the preceding statements, wherein the segment buffer is configured to store the first portion of the image data without also storing the second portion of the image data.
9. The display system of any one of any of the preceding statements, wherein: the segment buffer includes memory sufficient to store an entirety of the image data representing the image; and the segment map includes a first single-bit entry for the active segment and a second single-bit entry for the empty segment.
10. The display system of any one of any of the preceding statements, wherein: the segment buffer lacks memory sufficient to store an entirety of the image data representing the image; and the segment map includes a first multi-bit entry for the active segment and a second multi-bit entry for the empty segment.

11. The display system of any one of any of the preceding statements, implemented as a heads-up display system configured to pass through a view of a surrounding environment for the second subset of the set of pixels not driven during the time period.

12. An image buffer comprising: a segment analyzer configured to manage a segment map that distinguishes, for image data representing an image that is to be displayed during a time period: a first portion of the image data that corresponds to an active segment of the image containing non-zero content, from a second portion of the image data that corresponds to an empty segment of the image without non-zero content; and segment buffer memory configured to: store, based on the segment map, the first portion of the image data; and send the segment map and the first portion of the image data to a set of pixel drivers configured to use the segment map and the first portion of the image data to cause a set of pixels to display the image during the time period by driving a first subset of the set of pixels, the first subset associated with the active segment, and without driving a second subset of the set of pixels, the second subset associated with the empty segment.

13. The image buffer of any of the preceding statements, wherein: the image contains a plurality of rows; and the active segment and the empty segment of the image each correspond to less than an entire row of the plurality of rows.

14. The image buffer of any one of any of the preceding statements, wherein: the image includes a red image component, a green image component, and a blue image component; and the segment analyzer is configured to manage the segment map based on a color-agnostic analysis that distinguishes the first portion of the image data from the second portion of the image data based on non-zero content being contained in any of the red image component, the green image component, or the blue image component for the active segment.

15. The image buffer of any one of any of the preceding statements, wherein: the image includes a red image component, a green image component, and a blue image component; the segment analyzer is configured to manage the segment map based on a color-aware analysis of the image data performed separately for each of the red image component, the green image component, and the blue image component; and the segment map includes a red segment map component based on the color-aware analysis for the red image component, a green segment map component based on the color-aware analysis for the green image component, and a blue segment map component based on the color-aware analysis for the blue image component.

16. The image buffer of any one of any of the preceding statements, wherein the set of pixel drivers causes the set of pixels to display the image during the time period without driving the second subset of the set of pixels and further without fetching the second portion of the image data from the segment buffer memory.

17. The image buffer of any one of any of the preceding statements, wherein the segment buffer memory is configured to store the first portion of the image data without also storing the second portion of the image data.

18. A method comprising: managing, by an image buffer included in a display system, a segment map that identifies, within image data representing an image that is to be displayed during a time period: a first portion of the image data that corresponds to an active segment of the image containing non-zero content, and a second portion of the image data that corresponds to an empty segment of the image without non-zero content; storing, by the image buffer and based on the segment map, the first portion of the image data; and sending, by the image buffer, the segment map and the first portion of the image data to a set of pixel drivers configured to use the segment map and the first portion of the image data to cause a set of pixels to display the image during the time period by driving a first subset of the set of pixels, the first subset associated with the active segment, and without driving a second subset of the set of pixels, the second subset associated with the empty segment.

19. The method of any of the preceding statements, wherein: the image contains a plurality of rows; and the active segment and the empty segment of the image each correspond to less than an entire row of the plurality of rows.

20. The method of any one of any of the preceding statements, wherein: the image includes a red image component, a green image component, and a blue image component; the segment map is managed based on a color-aware analysis of the image data performed separately for each of the red image component, the green image component, and the blue image component; and the segment map includes a red segment map component based on the color-aware analysis for the red image component, a green segment map component based on the color-aware analysis for the green image component, and a blue segment map component based on the color-aware analysis for the blue image component.

21. A method comprising: performing, by a segment analyzer, an analysis of image data representing an image to be displayed during a time period, the analysis distinguishing: a first portion of the image data that corresponds to an active segment of the image containing non-zero content, from a second portion of the image data that corresponds to an empty segment of the image without non-zero content; storing, by a segment buffer, in accordance with a segment map based on the analysis, the first portion of the image data; causing, by a set of pixel drivers configured to use the segment map and the first portion of the image data stored in the segment buffer, a set of pixels to display the image during the time period by driving a first subset of the set of pixels, the first subset associated with the active segment, and without driving a second subset of the set of pixels, the second subset associated with the empty segment.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath." "below." "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A display system, comprising:

circuitry configured to perform an analysis of image data representing an image that includes a first component corresponding to a first color and a second component corresponding to a second color, the analysis including distinguishing:

a first portion of the image data that corresponds to a first segment of the first component of the image, from a second portion of the image data that corresponds to a second segment of the first component of the image, the first segment containing content of the first color and the second segment without content of the first color;

a buffer configured to store the first portion of the image data; and a set of pixel drivers configured, based on the analysis and the first portion of the image data stored in the buffer, to cause a set of pixels to display the first component of the image by driving a first subset of the set of pixels, the first subset associated with the first segment, and without driving a second subset of the set of pixels, the second subset associated with the second segment.

2. The display system of claim 1, wherein:

the image contains a plurality of rows; and the first segment and the second segment of the image each correspond to less than an entire row of the plurality of rows.

3. The display system of claim 1, wherein:
the image contains a plurality of rows;
the first segment corresponds to a first entire row of the plurality of rows; and
the second segment corresponds to a second entire row of the plurality of rows.

4. The display system of claim 1, wherein:
the image further includes a third component corresponding to a third color; and
the analysis is further performed for the third component.

5. The display system of claim 4, wherein the first color, the second color, and the third color collectively include colors red, green, and blue, such that the image includes a red image component, a green image component, and a blue image component.

6. The display system of claim 1, wherein a subset of the set of pixel drivers corresponding to the second subset of the set of pixels is configured to remain in an inactive state when the set of pixels displays the image.

7. The display system of claim 1, wherein the set of pixel drivers causes the set of pixels to display the image without driving the second subset of the set of pixels and further without fetching the second portion of the image data from the buffer.

8. The display system of claim 1, wherein the buffer is configured to store the first portion of the image data without also storing the second portion of the image data.

9. The display system of claim 1, wherein:
the buffer includes memory sufficient to store an entirety of the image data representing the image; and
a segment map used by the set of pixel drivers to cause the set of pixels to display the first component of the image includes a first single-bit entry for the first segment and a second single-bit entry for the second segment.

10. The display system of claim 1, wherein:
the buffer lacks memory sufficient to store an entirety of the image data representing the image; and
a segment map used by the set of pixel drivers to cause the set of pixels to display the first component of the image includes a first multi-bit entry for the first segment and a second multi-bit entry for the second segment.

11. The display system of claim 1, implemented as a heads-up display system configured to pass through a view of a surrounding environment for the second subset of the set of pixels not driven.

12. An image buffer comprising:
circuitry configured to manage a segment map that distinguishes, for image data representing an image that includes a first component corresponding to a first color and a second component corresponding to a second color:
a first portion of the image data that corresponds to a first segment of the first component of the image, from
a second portion of the image data that corresponds to a second segment of the image, the first segment containing content of the first color and the second segment without content of the first color; and
buffer memory configured to:
store, based on the segment map, the first portion of the image data; and
send the segment map and the first portion of the image data to a set of pixel drivers configured to use the segment map and the first portion of the image data to cause a set of pixels to display the first component of the image by driving a first subset of the set of pixels, the first subset associated with the first segment, and without driving a second subset of the set of pixels, the second subset associated with the second segment.

13. The image buffer of claim 12, wherein:
the image contains a plurality of rows; and
the first segment and the second segment of the image each correspond to less than an entire row of the plurality of rows.

14. The image buffer of claim 12, wherein:
the image further includes a third component corresponding to a third color; and
the circuitry is configured to manage the segment map based on the third component.

15. The image buffer of claim 14, wherein the first color, the second color, and the third color collectively include colors red, green, and blue, such that the image includes a component, a green image component, and a blue image component.

16. The image buffer of claim 12, wherein the set of pixel drivers causes the set of pixels to display the image without driving the second subset of the set of pixels and further without fetching the second portion of the image data from the buffer memory.

17. The image buffer of claim 12, wherein the buffer memory is configured to store the first portion of the image data without also storing the second portion of the image data.

18. A method comprising:
managing, by an image buffer included in a display system, a segment map that identifies, within image data representing an image that includes a first component corresponding to a first color and a second component corresponding to a second color:
a first portion of the image data that corresponds to a first segment of the first component of the image, and
a second portion of the image data that corresponds to a second segment of the first component of the image, the first segment containing content of the first color and the second segment without content of the first color;
storing, by the image buffer and based on the segment map, the first portion of the image data; and
sending, by the image buffer, the segment map and the first portion of the image data to a set of pixel drivers configured to use the segment map and the first portion of the image data to cause a set of pixels to display the image by driving a first subset of the set of pixels, the first subset associated with the first segment, and without driving a second subset of the set of pixels, the second subset associated with the second segment.

19. The method of claim 18, wherein:
the image contains a plurality of rows; and
the first segment and the second segment of the image each correspond to less than an entire row of the plurality of rows.

20. The method of claim 18, wherein:
the image further includes a third component corresponding to a third color;
the segment map is further managed based on the third component; and
the first color, the second color and the third color collectively include colors red, green, and blue, such that the segment map includes a red segment map component for a red image component, a green segment map component for a green image component, and a blue segment map component for a blue image component.

21. A method comprising:

performing, by circuitry of a display system, an analysis of image data representing an image that includes a first component corresponding to a first color and a second component corresponding to a second color, the analysis including distinguishing:

a first portion of the image data that corresponds to a first segment of the first component of the image, from a second portion of the image data that corresponds to a second segment of the first component of the image, the first segment containing content of the first color and the second segment without content of the first color;

storing, by a buffer, the first portion of the image data;

causing, by a set of pixel drivers configured, based on the analysis and the first portion of the image data stored in the buffer, a set of pixels to display the first component of the image by driving a first subset of the set of pixels, the first subset associated with the first segment, and without driving a second subset of the set of pixels, the second subset associated with the second segment.

* * * * *